US011419120B2

(12) United States Patent
Dou et al.

(10) Patent No.: US 11,419,120 B2
(45) Date of Patent: Aug. 16, 2022

(54) INFORMATION TRANSMISSION METHOD AND COMMUNICATIONS DEVICE

(71) Applicant: HUAWEI TECHNOLOGIES CO., LTD., Guangdong (CN)

(72) Inventors: Shengyue Dou, Shanghai (CN); Shibin Ge, Shanghai (CN); Ting Wang, Shanghai (CN); Yuanjie Li, Shanghai (CN); Xi Zhang, Kanata (CA); Xiaoyan Bi, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 58 days.

(21) Appl. No.: 16/861,842

(22) Filed: Apr. 29, 2020

(65) Prior Publication Data
US 2020/0260454 A1 Aug. 13, 2020

Related U.S. Application Data

(63) Continuation of application No. PCT/CN2018/115708, filed on Nov. 15, 2018.

(30) Foreign Application Priority Data
Nov. 17, 2017 (CN) .......................... 201711148937.3

(51) Int. Cl.
*H04W 72/04* (2009.01)
*H04W 76/11* (2018.01)
*H04L 5/00* (2006.01)

(52) U.S. Cl.
CPC ....... *H04W 72/0466* (2013.01); *H04L 5/0044* (2013.01); *H04W 72/0413* (2013.01); *H04W 72/0446* (2013.01); *H04W 76/11* (2018.02)

(58) Field of Classification Search
CPC ............. H04W 72/0466; H04W 76/11; H04W 72/0413; H04W 72/0446; H04W 72/042;
(Continued)

(56) References Cited

U.S. PATENT DOCUMENTS

2013/0215835 A1* 8/2013 Chen ..................... H04L 5/0035
370/329
2013/0279485 A1 10/2013 Gao et al.
(Continued)

FOREIGN PATENT DOCUMENTS

CN 101499985 A 8/2009
CN 102823181 A 12/2012
(Continued)

OTHER PUBLICATIONS

Pantech, Downlink Control signaling to support CoMP. 3GPP TSG RAN1 #68bis, Jeju, Korea, Mar. 26-Mar. 30, 2012, R1-121360, 4 pages.
(Continued)

*Primary Examiner* — Thai Nguyen
(74) *Attorney, Agent, or Firm* — Womble Bond Dickinson (US) LLP

(57) ABSTRACT

This disclosure provides an information transmission method and a communications device. The method includes: when determining that higher layer signaling is not configured with a scrambling identifier, scrambling or descrambling, by a communications device, data by using a second initial scrambling value, where the scrambling identifier is used by the communications device to determine a first initial scrambling value used for data scrambling or descrambling, and the second initial scrambling value is related to at least one or two of a cell identifier, a radio network temporary identifier, and a reserved bit. Therefore, in the embodiments of this disclosure, when determining
(Continued)

that the higher layer is not configured with the scrambling identifier, the communications device scrambles or descrambles the data by using the second initial scrambling value. This resolves a problem in the prior art that a terminal device cannot determine an initial scrambling value used for data scrambling.

15 Claims, 3 Drawing Sheets

(58) Field of Classification Search
CPC . H04W 28/02; H04W 72/04; H04W 72/1284; H04W 76/15; H04L 5/0044; H04L 5/0035; H04L 5/0091; H04L 5/0048; H04L 1/00
See application file for complete search history.

(56) References Cited

U.S. PATENT DOCUMENTS

| | | | |
|---|---|---|---|
| 2014/0293943 A1 | 10/2014 | Yoon | |
| 2015/0236828 A1* | 8/2015 | Park | H04L 27/2656 375/340 |
| 2019/0007175 A1* | 1/2019 | Kwak | H04L 5/0048 |
| 2020/0099461 A1 | 3/2020 | Chen et al. | |

FOREIGN PATENT DOCUMENTS

| | | |
|---|---|---|
| CN | 103748917 A | 4/2014 |
| EP | 3672136 A1 | 6/2020 |
| WO | 2011059379 A2 | 5/2011 |
| WO | 2012149651 A1 | 11/2012 |

OTHER PUBLICATIONS

Texas Instruments, Scrambling sequence initialization of DMRS for ePDCCH. 3GPP TSG RAN WG1 #69 , Prague, Czech Republic, May 21 25, 2012, R1-122740, 2 pages.

Huawei et al,"On data channel scrambling",3GPP TSG RAN WG1 Meeting 90bis, R1-1717059,Prague, Czech Republic, Oct. 9-13, 2017, total 3 pages.

* cited by examiner

INFORMATION TRANSMISSION METHOD AND COMMUNICATIONS DEVICE

CROSS-REFERENCE TO RELATED APPLICATIONS

This application is a continuation of International Application No. PCT/CN2018/115708, filed on Nov. 15, 2018, which claims priority to Chinese Patent Application No. 201711148937.3, filed on Nov. 17, 2017. The disclosures of the aforementioned applications are hereby incorporated by reference in their entireties.

TECHNICAL FIELD

This disclosure relates to the communications field, and in particular, to an information transmission method and a communications device.

BACKGROUND

In LTE, for physical downlink shared channel (PDSCH) transmission, all data streams are from a same network device, and an initialized scrambling value $c_{init}$ of downlink data sent by the network device may be determined based on the following formula:

$$c_{init}=n_{RNTI} \cdot 2^{14}+q \cdot 2^{13}+\lfloor n_s/2 \rfloor \cdot 2^9 + N_{ID}^{cell}$$

For physical uplink shared channel (PUSCH) transmission, an initialized scrambling value $c_{init}$ of uplink data sent by a terminal device may be determined based on the following formula:

$$c_{init}=n_{RNTI} \cdot 2^{14}+\lfloor n_s/2 \rfloor \cdot 2^9 + N_{ID}^{cell},$$

where $n_{RNTI}$ represents a network temporary identifier of the terminal device; q represents a code word (0: single code word/0, 1: multiplexing mode); $n_s$ represents a slot number; and $N_{ID}^{cell}$ represents a cell ID.

It can be learned from the foregoing descriptions that, in LTE, regardless of uplink data transmission or downlink data transmission, an initialized scrambling value used for data scrambling is fixed, and may be determined by using the foregoing corresponding formula.

In a new radio (NR) system, in existing standard discussion, an initial scrambling value used for data scrambling depends at least on a scrambling identifier (SCID) configured by using radio resource control (RRC). However, when an RRC connection is unavailable, for example, when the terminal device initially accesses a cell but no RRC connection has been established, or when the terminal device is in an RRC inactivestate, or when RRC signaling is not configured with the SCID, the terminal device cannot obtain the SCID by using RRC. Consequently, the terminal device cannot determine, based on the SCID, the initial scrambling value used for data scrambling. This affects network performance.

SUMMARY

This disclosure provides an information transmission method and a communications device, to improve network performance.

According to a first aspect, an information transmission method is provided. The method includes: when determining that higher layer signaling is not configured with a scrambling identifier, scrambling or descrambling, by a communications device, data by using a second initial scrambling value, where the scrambling identifier is used by the communications device to determine a first initial scrambling value used for data scrambling or descrambling, and the second initial scrambling value is related to at least one or two of a cell identifier, a radio network temporary identifier, and a reserved bit.

With reference to the first aspect, in an implementation of the first aspect, the communications device is a network device, or the communications device is a terminal device.

Uplink data transmission is used as an example. When the communications device is a network device, if the network device determines that the higher layer is not configured with the scrambling identifier, the network device descrambles received uplink data by using the second initial scrambling value. Correspondingly, when the communications device is a terminal device, if the terminal device determines that the higher layer signaling is not configured with the scrambling identifier, the terminal device scrambles sent uplink data by using the second initial scrambling value.

Downlink data transmission is used as another example. When the communications device is a network device, if the network device determines that the higher layer is not configured with the scrambling identifier, the network device scrambles downlink data by using the second initial scrambling value. Correspondingly, when the communications device is a terminal device, if the terminal device determines that the higher layer signaling is not configured with the scrambling identifier, the terminal device descrambles received downlink data by using the second initial scrambling value.

Optionally, in another embodiment, when the communications device determines that the higher layer signaling is configured with the scrambling identifier, the communications device determines, based on the scrambling identifier, the first initialized scrambling value used for data scrambling or descrambling, and scrambles sent data or descrambles received data based on the first initialized scrambling value.

Therefore, in the embodiments of this disclosure, when determining that the higher layer is not configured with the scrambling identifier, the communications device scrambles or descrambles the data by using the second initial scrambling value. This resolves a problem in the prior art that a terminal device cannot determine an initial scrambling value used for data scrambling.

With reference to the first aspect, in an implementation of the first aspect, a payload size of the second initial scrambling value is the same as a payload size of the first scrambling identifier; or a payload size of the second initial scrambling value is the same as a payload size of the first initial scrambling value.

With reference to the first aspect, in an implementation of the first aspect, when the second initial scrambling value is related to the radio network temporary identifier, and a payload of the radio network temporary identifier is less than a payload of the first scrambling identifier, the second initial scrambling value is related to the radio network temporary identifier and a zero padding bit, where a quantity of zero padding bits is a difference between the payload of the first scrambling identifier and the payload of the radio network temporary identifier.

With reference to the first aspect, in an implementation of the first aspect, the second initial scrambling value is related to the cell identifier and the radio network temporary identifier, and the second initial scrambling value is determined by the terminal device based on the following formula:

$$C_{init\_default}=A*2^N+B,$$

where $C_{init\ default}$ represents the second initial scrambling value, A represents one of the cell identifier and the radio network temporary identifier, B represents the other one of the cell identifier and the radio network temporary identifier, and N is an integer ranging from 0 to 127.

Optionally, in another embodiment, a value of N may be a quantity of bits obtained after B is converted into a binary value.

With reference to the first aspect, in an implementation of the first aspect, the second initial scrambling value is related to the cell identifier, the radio network temporary identifier, and the reserved bit, and the second initial scrambling value is determined by the terminal device based on the following formula:

$$C_{init\ default}=A*2^{N+M}+B*2^M+C,$$

where $C_{init\ default}$ represents the second initial scrambling value, A represents one of the cell identifier, the radio network temporary identifier, and the reserved bit, B represents one of the cell identifier, the radio network temporary identifier, and the reserved bit except A, M and N each are an integer ranging from 0 to 127, and C represents a remaining one obtained after both A and B are excluded from the cell identifier, the radio network temporary identifier, and the reserved bit.

With reference to the first aspect, in an implementation of the first aspect, the second initial scrambling value is related to the reserved bit and one of the cell identifier or the radio network temporary identifier, and the second initial scrambling value is determined by the terminal device based on the following formula:

$$C_{init\ default}=A*2^N+B,$$

where $C_{init\ default}$ represents the second initial scrambling value, A represents the cell identifier or the radio network temporary identifier, B represents the reserved bit, and N is an integer ranging from 0 to 127.

Optionally, in another embodiment, the radio network temporary identifier is an RNTI, where the RNTI is related to a feature of data transmission of the terminal device. In other words, as the feature of data transmission of the terminal device varies, the RNTI may vary.

Therefore, in the embodiments of this disclosure, when determining that the higher layer is not configured with the scrambling identifier, the communications device scrambles or descrambles the data by using the second initial scrambling value. This resolves a problem in the prior art that a terminal device cannot determine an initial scrambling value used for data scrambling.

According to a second aspect, an information transmission method is provided. The method includes: receiving, by a terminal device, higher layer signaling, where the higher layer signaling is used to indicate a first identifier and a second identifier; and generating, by the terminal device on a same time domain resource and based on the first identifier, first to-be-sent information or demodulating first received information, and generating, on the same time domain resource and based on the second identifier, second to-be-sent information or demodulating second received information, where the first to-be-sent information or the first received information corresponds to a first antenna port or a first antenna port set, the second to-be-sent information or the second received information corresponds to a second antenna port or a second antenna port set, and the first antenna port or the first antenna port set and the second antenna port or the second antenna port set are in a non-quasi co-location (non-QCL) relationship.

It should be understood that the first antenna port or the first antenna port set may correspond to a first network device, and the second antenna port or the second antenna port set may correspond to a second network device.

In other words, on the same time domain resource, the terminal device may communicate with the first network device by using the first identifier, and communicate with the second network device by using the second identifier.

Specifically, after the terminal device obtains the first identifier and the second identifier by using the higher layer signaling, on the same time domain resource (for example, a same slot), the terminal device communicates with the first network device by using the first identifier, for example, sends the first to-be-sent information or receives the first received information, and communicates with the second network device by using the second identifier, for example, sends the second to-be-sent information or receives the second received information.

Therefore, in the embodiments of this disclosure, two identifiers are configured by using the higher layer signaling, so that the terminal device may communicate with the two network devices based on the two identifiers, to meet a requirement of joint transmission and improve network performance.

With reference to the second aspect, in an implementation of the second aspect, the first to-be-sent information or received information and the first to-be-sent information or received information each include at least one of the following information:

downlink shared channel PDSCH data information, uplink shared channel PUSCH data information, downlink control channel PDCCH information, an uplink control channel PUCCH, an uplink sounding channel SRS, an uplink random access channel PRACH, an uplink or downlink demodulation reference signal DMRS, a downlink channel measurement reference signal CSI-RS, downlink phase tracking information PTRS, or a downlink tracking signal TRS.

With reference to the second aspect, in an implementation of the second aspect, the first identifier is a first sequence generation identifier, the first sequence generation identifier is used to determine a first base sequence, the second identifier is a second sequence generation identifier, and the second sequence generation identifier is used to determine a second base sequence; and the generating, by the terminal device on a same time domain resource and based on the first identifier, first to-be-sent information or demodulating first received information, and generating, on the same time domain resource and based on the second identifier, second to-be-sent information or demodulating second received information includes:

determining, by the terminal device, the first base sequence based on the first sequence generation identifier, and determining the second base sequence based on the second sequence generation identifier;

performing, by the terminal device, cyclic shift on the first base sequence to generate a third sequence, and performing cyclic shift on the second base sequence to generate a fourth sequence; and sending, by the terminal device on the same time domain resource, data feedback information corresponding to the third sequence over a first physical uplink control channel PUCCH, and sending data feedback information corresponding to the fourth sequence over a second PUCCH, where the first to-be-sent information is the data feedback information corresponding to the third sequence, and the second to-be-sent information is the data feedback information corresponding to the fourth sequence.

With reference to the second aspect, in an implementation mode of the second aspect, the higher layer signaling is used to configure a time-frequency resource occupied by the first PUCCH and the first sequence generation identifier used for the data feedback information transmitted over the first PUCCH, and a time-frequency resource occupied by the second PUCCH and the second sequence generation identifier used for the data feedback information transmitted over the second PUCCH.

It should be understood that, in the embodiments of this disclosure, higher layer signaling for configuring the first PUCCH and the second PUCCH may be same higher layer signaling (for example, RRC signaling), or may be different higher layer signaling (for example, RRC signaling). The embodiments of this disclosure are not limited thereto.

It should be understood that the foregoing describes a solution in which the corresponding sequence generation identifiers are configured when there are two PUCCHs and when the PUCCH resources are configured by using the higher layer signaling. Optionally, similarly, in the embodiments of this disclosure, different quantities of PUCCHs may be considered. To be specific, when a PUCCH resource is configured by a higher layer, a sequence generation identifier (which may also be referred to as a sequence generation identifier corresponding to the PUCCH) used for data feedback information transmitted on the PUCCH resource is also configured.

With reference to the second aspect, in an implementation of the second aspect, the method further includes:

receiving, by the terminal device, first downlink control information DCI transmitted on a first PDCCH resource and second DCI transmitted on a second PDCCH resource, where the data feedback information carried by the first PUCCH corresponds to data scheduled by using the first DCI, the data scheduled by using the first DCI corresponds to the first antenna port or the first antenna port set, the data feedback information carried by the second PUCCH corresponds to data scheduled by using the second DCI, and the data scheduled by using the second DCI corresponds to the second antenna port or the second antenna port set.

For example, the terminal device receives the first DCI sent by the first network device and the second DCI sent by the second network device, and then determines, based on the first DCI and the second DCI, PUCCH resources such as a PUCCH resource 0 and a PUCCH resource 2, and separately sends the feedback information on the PUCCH resources. Specifically, the terminal device sends the feedback information on the PUCCH resource 0 by using the first sequence generation identifier, and sends the feedback information on the PUCCH resource 2 by using the second sequence generation identifier.

Therefore, in the foregoing scenario 1, when the terminal device sends a plurality of PUCCHs to different network devices, for example, when two network devices simultaneously schedule a same terminal device, and PUCCH resources of the terminal device are directly configured by using RRC signaling, the two network devices add, to the RRC signaling, a sequence generation identifier corresponding to each group of PUCCH resources, to ensure that the PUCCHs sent by the terminal device to the two network devices use different base sequences, so as to ensure that PUCCH sequences multiplex a capacity of the terminal device. This implements relatively small interference between two PUCCHs transmitted to the two network devices, and improves network performance.

With reference to the second aspect, in an implementation of the second aspect, the higher layer signaling is used to indicate a control resource set corresponding to a physical downlink control channel PDCCH, the first sequence generation identifier used for the data feedback information transmitted on a PUCCH resource corresponding to a first PDCCH resource in the control resource set, and the second sequence generation identifier used for the data feedback information transmitted on a second PDCCH resource.

Therefore, when independent scheduling is performed by using a plurality of pieces of DCI, to be specific, when each network device independently sends one PDCCH to a same terminal device, each PDCCH occupies a different CORESET. This is configured by using RRC signaling. In this case, DCI carried in the CORESET is used to schedule downlink data, and a PUCCH corresponding to the DCI may use a sequence generation ID configured in the CORESET.

For example, when the CORESET is configured by using the RRC signaling, the generation ID is also generated, so that an ID used by the PUCCH corresponding to the DCI in the CORESET may be determined.

With reference to the second aspect, in an implementation of the second aspect, the higher layer signaling is further used to indicate a correspondence between the first sequence generation identifier and the first PUCCH and a correspondence between the second sequence generation identifier and the second PUCCH.

Specifically, the network device may directly configure the two sequence generation identifiers for the terminal device by using the higher layer signaling. In addition, a correspondence between the sequence generation identifiers and two PUCCHs in a same slot is indicated in the higher layer signaling.

For example, if the two PUCCHs in the same slot are respectively a short PUCCH and a long PUCCH, RRC signaling is used to configure that the short PUCCH uses a sequence generation ID 1, and the ID 1 may use a serving cell ID; and RRC signaling is used to configure that the long PUCCH uses a sequence generation ID 2, and the ID 2 may use a coordinating cell ID.

According to the method in the embodiments of this disclosure, it may be ensured that the two PUCCHs in the same slot do not interfere with each other, and when the two PUCCHs are simultaneously scheduled by a plurality of base stations, sent resources do not affect each other.

The foregoing describes a case in which the feedback information corresponding to the DCI is transmitted over the PUCCHs in the embodiments of this disclosure. Similarly, the terminal device also sends, in the foregoing manner, a DMRS used for PUCCH demodulation. In other words, in the embodiments of this disclosure, two IDs may also be configured by using higher layer signaling, so that the terminal device determines sequences based on the foregoing similar process, and separately sends the sequences by using two uplink channels. For a specific process, refer to the foregoing descriptions. To avoid repetition, details are not described herein again.

With reference to the second aspect, in an implementation mode of the second aspect, the first identifier is a first scrambling identifier, the second identifier is a second scrambling identifier, the first scrambling identifier is used by the terminal device to determine a first initialized scrambling value used for data scrambling, and the second scrambling identifier is used by the terminal device to determine a second initialized scrambling value used for data scrambling; and the generating, by the terminal device on a same time domain resource and based on the first identifier, first to-be-sent information or demodulating first received information, and generating, on the same time domain resource and based on the second identifier, second to-be-sent information or demodulating second received information includes:

generating, by the terminal device, the first initialized scrambling value by using the first scrambling identifier, and generating the second initialized scrambling value by using the second scrambling identifier; and generating, by the terminal device on the same time domain resource and by using the first initialized scrambling value, first to-be-sent data or descrambles first received data, and generating, on the same time domain resource and by using the second initialized scrambling value, second to-be-sent data or descrambles second received data, where the first to-be-sent information is the first to-be-sent data, the first received information is the first received data, the second to-be-sent information is the second to-be-sent data, and the second received information is the second received data.

In other words, on the same time domain resource, the terminal device communicates with the first network device by using the first initialized scrambling value, and communicates with the second network device by using the second initialized scrambling value.

Specifically, the network device configures at least two different scrambling identifiers for the terminal device by using higher layer signaling, so that the terminal device may separately scramble, by using the two scrambling identifiers, uplink data transmitted to the two network devices. Alternatively, the terminal device may separately descramble, by using the two data scrambling identifiers, received downlink data sent by the two network devices.

With reference to the second aspect, in an implementation mode of the second aspect, the higher layer signaling is further used to indicate a correspondence between the first scrambling identifier and the first antenna port or the first antenna port group, and a correspondence between the second scrambling identifier and the second antenna port or the second antenna port group.

It should be understood that, in the embodiments of this disclosure, the antenna port may be a DMRS antenna port, a PTRS antenna port, or a TRS antenna port. The antenna port group may be a DMRS antenna port group, a PTRS antenna port group, or a TRS antenna port group. The embodiments of this disclosure are not limited thereto.

Therefore, the terminal device may separately scramble, based on the two scrambling identifiers, uplink data transmitted to the two network devices. Alternatively, the terminal device may separately descramble, by using the two data scrambling identifiers, received downlink data sent by the two network devices.

Therefore, in the embodiments of this disclosure, when communicating with the two network devices, the terminal device separately scrambles or descrambles data communicated with the two network devices by using the two scrambling identifiers. Therefore, interference between signals is reduced, and the network performance is improved.

With reference to the second aspect, in an implementation of the second aspect, the first identifier is the same as the second identifier.

Specifically, the two identifiers configured by using the higher layer signaling may be the same or may be different. The embodiments of this disclosure are not limited thereto.

For example, when there are a plurality of network devices in a same cell (in other words, cell IDs of the plurality of network devices are the same), configured sequence generation Ids are configured to be a same ID by using the higher layer signaling, to implement PUCCH transmission in this scenario. Because scheduling is performed by the plurality of network devices, it may be considered that sent PUCCHs use different base sequences, so that the PUCCHs are orthogonal, and mutual interference is avoided.

According to the method in the embodiments of this disclosure, configuration performed by using the higher layer signaling is more flexible, and a requirement of a 5G (NR) dense base station scenario can be met.

According to a third aspect, an information transmission method is provided. The method includes: generating, by a network device, higher layer signaling, where the higher layer signaling is used to indicate a first identifier and a second identifier; and sending, by the network device, the higher layer signaling to a terminal device, so that on a same time domain resource, the terminal device generates, based on the first identifier, first to-be-sent information or demodulates first received information, and generates, based on the second identifier, second to-be-sent information or demodulates second received information, where the first to-be-sent information or the first received information corresponds to a first antenna port or a first antenna port set, the second to-be-sent information or the second received information corresponds to a second antenna port or a second antenna port set, and the first antenna port or the first antenna port set and the second antenna port or the second antenna port set are in a non-quasi co-location (non-QCL) relationship.

Therefore, in the embodiments of this disclosure, the two identifiers are configured by using the higher layer signaling, so that the terminal device may communicate with the two network devices based on the two identifiers, to meet a requirement of joint transmission and improve network performance.

It should be understood that the method performed by the network device in the third aspect corresponds to the method performed by the terminal device in the second aspect. For corresponding descriptions of the third aspect, refer to the descriptions in the second aspect. To avoid repetition, detailed descriptions are appropriately omitted in the third aspect.

With reference to the third aspect, in an implementation of the third aspect, the first identifier is a first sequence generation identifier, the first sequence generation identifier is used to determine a first base sequence, the second identifier is a second sequence generation identifier, and the second sequence generation identifier is used to determine a second base sequence; and the first base sequence is used to generate a third sequence through cyclic shift, and the second base sequence is used to generate a fourth sequence through cyclic shift on; and the third sequence is used by the terminal device to send data feedback information corresponding to the third sequence over a first physical uplink control channel PUCCH and on the same time domain resource, and the fourth sequence is used by the terminal device to send data feedback information corresponding to the fourth sequence over a second PUCCH and on the same time domain resource, where the first to-be-sent information is the data feedback information corresponding to the third sequence, and the second to-be-sent information is the data feedback information corresponding to the fourth sequence.

With reference to the third aspect, in an implementation of the third aspect, the higher layer signaling is used to configure a time-frequency resource occupied by the first PUCCH and the first sequence generation identifier used for the data feedback information transmitted over the first PUCCH, and a time-frequency resource occupied by the second PUCCH and the second sequence generation identifier used for the data feedback information transmitted over the second PUCCH.

With reference to the third aspect, in an implementation of the third aspect, the method further includes: receiving, by the terminal device, first downlink control information DCI transmitted on a first PDCCH resource and second DCI transmitted on a second PDCCH resource, where the data feedback information carried by the first PUCCH corresponds to data scheduled by using the first DCI, the data scheduled by using the first DCI corresponds to the first antenna port or the first antenna port set, the data feedback information carried by the second PUCCH corresponds to data scheduled by using the second DCI, and the data scheduled by using the second DCI corresponds to the second antenna port or the second antenna port set.

With reference to the third aspect, in an implementation of the third aspect, the higher layer signaling is further used to indicate a correspondence between the first sequence generation identifier and the first PUCCH and a correspondence between the second sequence generation identifier and the second PUCCH.

With reference to the third aspect, in an implementation of the third aspect, the first identifier is a first scrambling identifier, the second identifier is a second scrambling identifier, the first scrambling identifier is used by the terminal device to determine a first initialized scrambling value used for data scrambling, and the second scrambling identifier is used by the terminal device to determine a second initialized scrambling value used for data scrambling; and the first initialized scrambling value and the second initialized scrambling value are respectively used by the terminal device to generate, on the same time domain resource and by using the first initialized scrambling value, first to-be-sent data or demodulate first received data, and generate, on the same time domain resource and by using the second initialized scrambling value, second to-be-sent data or demodulate second received data, where the first to-be-sent information is the first to-be-sent data, the first received information is the first received data, the second to-be-sent information is the second to-be-sent data, and the second received information is the second received data.

With reference to the third aspect, in an implementation of the third aspect, the higher layer signaling is further used to indicate a correspondence between the first scrambling identifier and the first antenna port or the first antenna port group, and a correspondence between the second scrambling identifier and the second antenna port or the second antenna port group.

With reference to the third aspect, in an implementation of the third aspect, the first identifier is the same as the second identifier.

According to a fourth aspect, a communications device is provided. The communications device includes modules or units configured to perform the method according to any one of the first aspect or the possible implementations of the first aspect.

According to a fifth aspect, a terminal device is provided. The terminal device includes modules or units configured to perform the method according to any one of the second aspect or the possible implementations of the second aspect.

According to a sixth aspect, a network device is provided. The network device includes modules or units configured to perform the method according to any one of the third aspect or the possible implementations of the first aspect.

According to a seventh aspect, a communications device is provided. The communications device includes a transceiver, a processor, and a memory. The processor is configured to control the transceiver to receive or send a signal, the memory is configured to store a computer program, and the processor is configured to invoke the computer program from the memory and run the computer program, to enable the first terminal device to perform the method according to any one of the first aspect or the possible implementations of the first aspect.

According to an eighth aspect, a terminal device is provided. The terminal device includes a transceiver, a processor, and a memory. The processor is configured to control the transceiver to receive or send a signal, the memory is configured to store a computer program, and the processor is configured to invoke the computer program from the memory and run the computer program, to enable the first network device to perform the method according to any one of the second aspect or the possible implementations of the second aspect.

According to a ninth aspect, a network device is provided. The network device includes a transceiver, a processor, and a memory. The processor is configured to control the transceiver to receive or send a signal, the memory is configured to store a computer program, and the processor is configured to invoke the computer program from the memory and run the computer program, to enable the second terminal device to perform the method according to any one of the third aspect or the possible implementations of the third aspect.

In a possible design, the foregoing communications device may be implemented by using a chip.

In a possible design, the foregoing terminal device may be implemented by using a chip.

In a possible design, the foregoing network device may be implemented by using a chip.

According to a tenth aspect, a computer program product is provided. The computer program product includes a computer program (also referred to as code or an instruction). When the computer program is run, a computer is enabled to perform the method according to any one of the first aspect to the third aspect and the possible implementations of the first aspect to the third aspect.

According to an eleventh aspect, a computer-readable medium is provided. The computer-readable medium stores a computer program (also referred to as code or an instruction). When the computer program is run on a computer, the computer is enabled to perform the method according to any one of the first aspect to the third aspect and the possible implementations of the first aspect to the third aspect.

DESCRIPTION OF EMBODIMENTS

Figure 1:
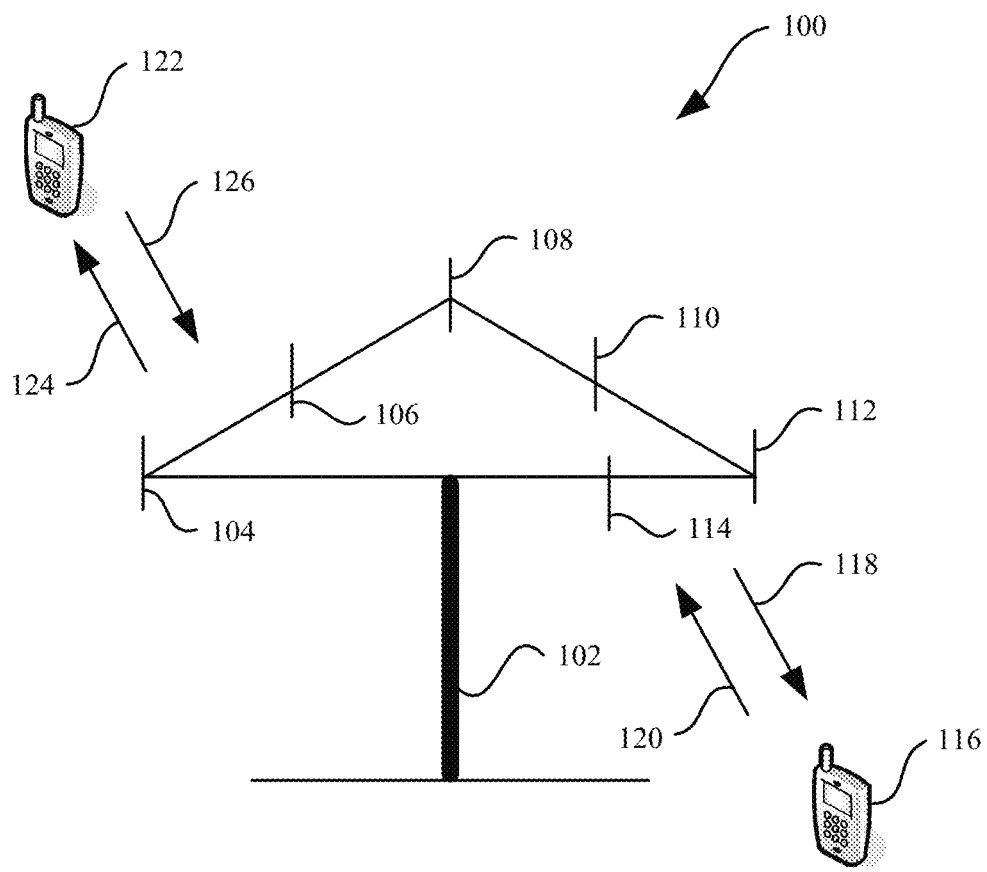
FIG. 1 is a schematic diagram of a communications system to which embodiments of this disclosure are applicable.

The following describes the technical solutions of this disclosure with reference to the accompanying drawings.

Embodiments of this disclosure may be applied to various communications systems. Therefore, the following descriptions are not limited to a particular communications system. For example, the embodiments of this disclosure are applicable to a long term evolution (LTE) system, a future fifth generation (5G) system (which is also referred to as a new radio (NR) system sometimes), and various evolved or converged systems.

A network device in the embodiments of this disclosure may be a device having a wireless transmission/reception function, including but not limited to: a base station, a relay station, an access point, a vehicle-mounted device, a wearable device, a network side device in a future 5G network, or a network device in a future evolved public land mobile network (PLMN), an access point in a Wi-Fi system, user equipment (UE), or the like. For example, the network device may be a transmission point (TRP or TP) in the NR system, a gNodeB (gNB) in the NR system, or one antenna panel or a group of antenna panels (including a plurality of antenna panels) of a gNodeB in the 5G system. This is not specifically limited in the embodiments of this disclosure.

A terminal device in the embodiments of this disclosure may be a device having a wireless transmission/reception function, including but not limited to: UE, an access terminal, a subscriber unit, a subscriber station, a mobile station, a mobile station, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, an unmanned aerial vehicle device, a smart appliance, a terminal device in a future network, a terminal device in a future evolved PLMN, or the like. This is not limited in the embodiments of this disclosure.

The embodiments of this disclosure may be applicable to any of the foregoing communications. For example, the embodiments of this disclosure may be applied to an LTE system and a subsequent evolved system such as 5G or other wireless communications systems using various radio access technologies, for example, systems using access technologies such as code division multiple access, frequency division multiple access, time division multiple access, orthogonal frequency division multiple access, and single carrier frequency division multiple access, and particularly applicable to a scenario in which channel information needs to be fed back and/or a two-stage precoding technology needs to be used, for example, a wireless network using a massive MIMO technology or a wireless network using a distributed antenna technology.

FIG. 1 is a schematic diagram of a communications system to which the embodiments of this disclosure are applicable. As shown in FIG. 1, the communications system 100 includes a network side device 102, and the network side device 102 may include a plurality of antenna groups. Each antenna group may include a plurality of antennas. For example, one antenna group may include antennas 104 and 106, another antenna group may include antennas 108 and 110, and an additional group may include antennas 112 and 114. FIG. 1 shows two antennas for each antenna group, but each group may include more or fewer antennas. The network side device 102 may additionally include a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving.

The network side device 102 may communicate with a plurality of terminal devices (such as a terminal device 116 and a terminal device 122). However, it may be understood that the network side device 102 may communicate with any quantity of terminal devices similar to the terminal device 116 or 122. The terminal devices 116 and 122 may each be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114, where the antennas 112 and 114 send information to the terminal device 116 over a forward link 118, and receive information from the terminal device 116 over a reverse link 120. In addition, the terminal device 122 communicates with the antennas 104 and 106, where the antennas 104 and 106 send information to the terminal device 122 over a forward link 124, and receive information from the terminal device 122 over a reverse link 126.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may share a frequency band, and the forward link 124 and the reverse link 126 may share a frequency band.

Each antenna group and/or region designed for communication is referred to as a sector of the network side device 102. For example, an antenna group may be designed to communicate with a terminal device in the sector within coverage of the network side device 102. When the network side device 102 communicates with the terminal devices 116 and 122 over the forward links 118 and 124 respectively, transmit antennas of the network side device 102 may increase signal-to-noise ratios of the forward links 118 and 124 through beamforming. In addition, compared with a manner in which the network side device sends signals to all terminal devices of the network side device by using a single antenna, when the network side device 102 sends, through beamforming, signals to the terminal devices 116 and 122 that are randomly distributed in related coverage, a mobile device in a neighboring cell is subject to relatively less interference.

At a given time, the network side device 102, the terminal device 116, or the terminal device 122 may be a wireless communications sending apparatus and/or a wireless communications receiving apparatus. When sending data, the wireless communications sending apparatus may encode data for transmission. Specifically, the wireless communications sending apparatus may obtain (for example, generate, receive from another communications apparatus, or store in a memory) a particular quantity of data bits to be sent, over a channel, to the wireless communications receiving apparatus. The data bits may be included in a transport block (or a plurality of transport blocks) of the data, and the transport block may be segmented to produce a plurality of code blocks.

In addition, the communications system 100 may be a public land mobile network PLMN, a device-to-device (D2D) network, a machine-to-machine (M2M) network, or another network. FIG. 1 is merely an example of a simplified schematic diagram for ease of understanding, and the network may further include another network device that is not shown in FIG. 1.

Figure 2:
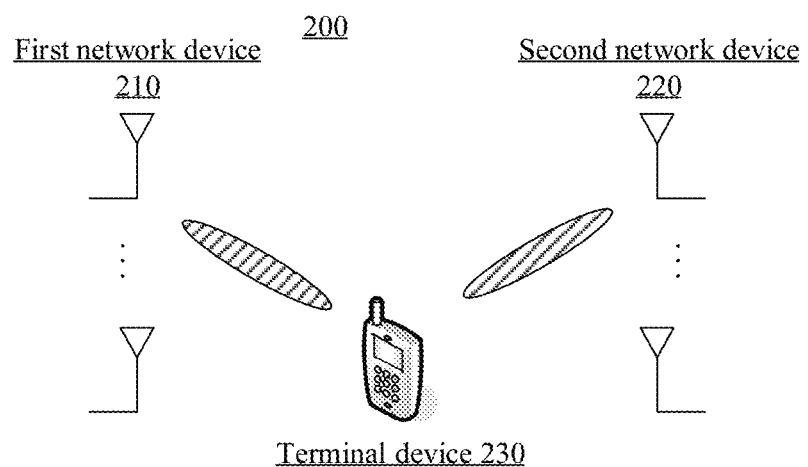
FIG. 2 is a schematic diagram of another communications system to which embodiments of this disclosure are applicable.

FIG. 2 is a schematic block diagram of another wireless communications system 200 to which the embodiments of this disclosure are applicable. The wireless communications system 200 may include at least two network devices 210 and 220 such as a first network device 210 and a second network device 220, and one or more terminal devices 230. The terminal device 230 may be mobile or fixed. The first network device 210 and the second network device 220 each may communicate with the terminal device 230 through a wireless air interface. The first network device 210 and the second network device 220 each may provide communication coverage for a particular geographical area, and may communicate with a terminal device within the coverage area.

A person skilled in the art may clearly understand that for ease of description, various numbers such as "first" and "second" in this disclosure are only for distinguishing, and are not intended to limit the embodiments of this disclosure.

The wireless communications system 200 can support CoMP transmission. To be specific, the at least two network devices (transmission points) transmit downlink data to the terminal device through coordinated multipoint transmission/reception. In other words, the terminal device 230 may communicate with the first network device 210 or the second network device 220 in a same carrier. The coordinated multipoint transmission/reception may be implemented by using a technology such as space diversity and/or spatial multiplexing. This is not limited in this disclosure.

The "coordinated multipoint transmission/reception" in this disclosure includes but is not limited to joint transmission JT. The JT includes coherent JT and non-coherent JT (NCJT). A difference between the coherent JT and the NCJT lies in that beamforming is performed on different MIMO data streams from a plurality of coordinated TPs separately in the NCJT, but joint beamforming is performed on all MIMO data streams from a plurality of coordinated TPs in the coherent JT.

In the embodiments of this disclosure, the first network device may be a serving network device, and the second network device may be a coordinating network device; or the first network device may be a coordinating network device, and the second network device is a serving network device.

For example, the first network device is a serving network device, and the second network device is a coordinating network device. There may be one or more second network devices. In addition, antenna ports of the first network device and antenna ports of the second network device satisfy different quasi-co-location (QCL) relationships. Alternatively, both the first network device and the second network device may be serving network devices. The embodiments of this disclosure are not limited thereto.

For a definition of the QCL in the embodiments of this disclosure, refer to that in LTE. To be specific, signals sent through QCL-ed antenna ports undergo same large-scale fading. The large-scale fading includes one or more of the following: delay spread, Doppler spread, Doppler shift, an average channel gain, an average delay, and the like. Alternatively, for a definition of the QCL in the embodiments of this disclosure, refer to that in 5G In a new radio NR system, a definition of QCL is similar to that in an LTE system, but spatial domain information is added. For example, signals sent through QCL-ed antenna ports undergo same large-scale fading. The large-scale fading includes one or more of the following parameters: delay spread, Doppler spread, Doppler shift, an average channel gain, an average delay, a spatial domain parameter, and the like. The spatial domain parameter may be, for example, one or more of an angle of departure (AOA), an angle of arrival (AOD), a channel correlation matrix, a power spread spectrum, a spatial filter, a spatial filtering parameter, or a spatial reception parameter.

In a scenario in which the coordinated multipoint transmission/reception is applied, the serving network device may send control signaling to the terminal device, and the coordinating network device may send data to the terminal device; or the serving network device may send control signaling to the terminal device, and the serving network device and the coordinating network device may both send data to the terminal device; or the serving network device and the coordinating network device may both send control signaling to the terminal device, and the serving network device and the coordinating network device may both send data to the terminal device. This is not particularly limited in the embodiments of this disclosure. Communication may be performed between the serving network device and the coordinating network device, and may be performed between a plurality of coordinating network devices. For example, a control message is transferred through an X2 interface.

In other words, in the coordinated multipoint transmission/reception scenario, joint scheduling performed by the network devices may be supported, and separate scheduling performed by the network devices may also be supported. In the joint scheduling performed by the network devices, DCI may be sent by one of the network devices, and data may be jointly sent by two of the network devices. In the separate scheduling performed by the network devices, the two network devices separately send DCI, and the two network devices jointly send data.

It has been described above that, in a new radio (NR) system, in existing standard discussion, an initial scrambling value used for data scrambling depends at least on a scrambling identifier SCID) configured by using radio resource control (RRC). However, if a higher layer is not configured with the scrambling identifier (for example, when an RRC connection is unavailable, and the terminal device initially accesses a cell but no RRC connection has been not established, or when the terminal device is in an RRC inactive state), or when RRC signaling is not configured with the SCID, the terminal device cannot obtain the SCID by using RRC. Consequently, the terminal device cannot determine, based on the SCID, the initial scrambling value used for data scrambling. This affects network performance.

For the foregoing problem, the embodiments of this disclosure provides a method for scrambling or descrambling data by using a second initial scrambling value (the second initial scrambling value may be a default value) when the higher layer is not configured with the scrambling identifier. This resolves a problem in the prior art that a terminal device cannot determine an initial scrambling value used for data scrambling.

For ease of understanding and description, by way of example rather than limitation, an information transmission method in this disclosure is described in detail below.

Figure 3:
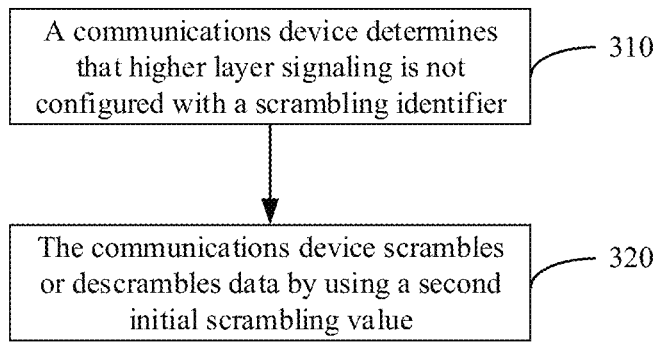
FIG. 3 is a schematic flowchart of an information transmission method according to an embodiment of this disclosure.

FIG. 3 is a schematic flowchart of an information transmission method 300 according to an embodiment of this disclosure. The method shown in FIG. 3 may be applied to the system architecture shown in FIG. 1 or FIG. 2. Specifically, the method 300 shown in FIG. 3 may be performed by a communications device, and the communications device may be a network device or a terminal device. The embodiments of this disclosure are not limited thereto. Specifically, the method 300 shown in FIG. 3 includes the following blocks.

310: The communications device determines that higher layer signaling is not configured with a scrambling identifier.

320: The communications device scrambles or descrambles data by using a second initial scrambling value, where the scrambling identifier is used by the communications device to determine a first initialized scrambling value used for data scrambling, and the second initial scrambling value is related to at least one or two of a cell identifier, a radio network temporary identifier RNTI, and a reserved bit.

Uplink data transmission is used as an example. When the communications device is a network device, if the network device determines that the higher layer is not configured with the scrambling identifier, the network device descrambles received uplink data by using the second initial scrambling value. Correspondingly, when the communications device is a terminal device, if the terminal device determines that the higher layer signaling is not configured with the scrambling identifier, the terminal device scrambles sent uplink data by using the second initial scrambling value.

Downlink data transmission is used as another example. When the communications device is a network device, if the network device determines that the higher layer is not configured with the scrambling identifier, the network device scrambles downlink data by using the second initial scrambling value. Correspondingly, when the communications device is a terminal device, if the terminal device determines that the higher layer signaling is not configured with the scrambling identifier, the terminal device descrambles received downlink data by using the second initial scrambling value.

Optionally, in another embodiment, when the communications device determines that the higher layer signaling is configured with the scrambling identifier, the communications device determines, based on the scrambling identifier, the first initialized scrambling value used for data scrambling or descrambling, and scrambles sent data or descrambles received data based on the first initialized scrambling value.

Therefore, in the embodiments of this disclosure, when determining that the higher layer is not configured with the scrambling identifier, the communications device scrambles or descrambles the data by using the second initial scrambling value. This resolves a problem in the prior art that a terminal device cannot determine an initial scrambling value used for data scrambling.

It should be understood that, in the embodiments of this disclosure, the cell identifier may be an identifier of a cell in which the communications device is located.

Optionally, in another embodiment, a payload size of the second initial scrambling value is the same as a payload size of the first scrambling identifier; or a payload size of the second initial scrambling value is the same as a payload size of the first initial scrambling value.

Optionally, in another embodiment, when the second initial scrambling value is related to the radio network temporary identifier, and a payload of the radio network temporary identifier is less than a payload of the first scrambling identifier, the second initial scrambling value is related to the radio network temporary identifier and a zero padding bit, where a quantity of zero padding bits is a difference between the payload of the first scrambling identifier and the payload of the radio network temporary identifier.

It should be understood that, in the embodiments of this disclosure, the second initial scrambling value may be related to two or three of the cell identifier, the radio network temporary identifier, and the reserved bit.

For example, the second initial scrambling value is related to the cell identifier and the radio network temporary identifier.

Specifically, the second initial scrambling value is determined by the communications device based on the following formula:

$$C_{init\_default} = A*2^N + B,$$

where $C_{init\_default}$ represents the second initial scrambling value, A represents one of the cell identifier and the radio network temporary identifier, B represents the other one of the cell identifier and the radio network temporary identifier, and N is any integer ranging from 0 to 127.

Optionally, in another embodiment, a value of N may be a quantity of bits obtained after B is converted into a binary value.

It should be understood that, in the embodiments of this disclosure, the symbol "*" represents "multiply", and both A and B represent decimal values.

The radio network temporary identifier may be a radio network temporary identifier RNTI of the terminal device, for example, may be represented by using a letter $n_{RNTI}$, and the cell identifier may be, for example, represented by using a letter $N_{ID}^{cell}$.

Optionally, the radio network temporary identifier may be placed ahead in the formula. To be specific, A is $n_{RNTI}$, and B is $N_{ID}^{cell}$. When $N_1$ represents a quantity of bits of $N_{ID}^{cell}$, the formula for determining the second initial scrambling value may be transformed as follows:

$$c_{init\_default} = n_{RNTI} \cdot 2^{N_1} + N_{ID}^{cell}$$

Optionally, the cell identifier may be placed ahead in the formula. To be specific, A is $N_{ID}^{cell}$, and B is $n_{RNTI}$. When $N_2$ represents a quantity of bits of $n_{RNTI}$, the formula for determining the second initial scrambling value may be transformed as follows:

$$c_{init\_default} = N_{ID}^{cell} \cdot 2^{N_2} + n_{RNTI}$$

It should be understood that the foregoing describes only a case in which the second initial scrambling value is related to the identifier of the cell in which the communications device is located and the radio network temporary identifier.

Optionally, in the embodiments of this disclosure, for forward compatibility or another subsequent purpose, the second initial scrambling value in the embodiments of this disclosure may further be related to the reserved bit. A quantity of bits of the reserved bit may be determined based on a specific actual situation. The embodiments of this disclosure are not limited thereto.

Optionally, in another embodiment, the foregoing described formula for determining the second initial scrambling value may be correspondingly transformed. For example, $N_{ID}^{cell}$ or $n_{RNTI}$ in the foregoing two formulas is replaced with the reserved bit.

For example, the second initial scrambling value is related to the reserved bit and one of the cell identifier or the radio network temporary identifier, and the second initial scrambling value is determined by the terminal device based on the following formula:

$$C_{init\_default} = A*2^N + B,$$

where $C_{init\_default}$ represents the second initial scrambling value, A represents the cell identifier or the radio network temporary identifier, B represents the reserved bit, and N is any integer ranging from 0 to 127. For example, N represents a quantity of bits obtained after B is converted into a binary value.

It should be understood that N, $N_1$, and $N_2$ may be any value (including 0 and 127) ranging from 0 to 127. This embodiment of this disclosure is not limited to the foregoing example.

The foregoing describes examples in which the second initial scrambling value is related to two of the cell identifier, the radio network temporary identifier, and the reserved bit. Optionally, in another embodiment, the second initial scrambling value is related to the cell identifier, the radio network identification identifier, and the reserved bit. Correspondingly, the second initial scrambling value is determined by the terminal device based on the following formula:

$$C_{init\_default} = A*2^{N+M} + B*2^M + C,$$

where $C_{init\_default}$ represents the second initial scrambling value, A represents one of the cell identifier, the radio network temporary identifier, and the reserved bit, B represents one of the cell identifier, the radio network temporary identifier, and the reserved bit except A, C represents a remaining one obtained after both A and B are excluded from the cell identifier, the radio network temporary identifier, and the reserved bit, and M and N each are any integer ranging from 0 to 127.

For example, N may be a quantity of bits obtained after B is converted into a binary value, and M may be a quantity of bits obtained after C is converted into a binary value.

It should be understood that, in the embodiments of this disclosure, the symbol "*" represents "multiply", and both A and B represent decimal values.

For example, the radio network temporary identifier may be represented by using a letter $n_{RNTI}$, the cell identifier may be represented, for example, by using a letter $N_{ID}^{cell}$, and the reserved bit may be represented as reserved. When A is $n_{RNTI}$, B is $N_{ID}^{cell}$, $N_1$ represents a quantity of bits of $N_{ID}^{cell}$, and $N_3$ represents a quantity of reserved bits, the formula for determining the second initial scrambling value may be transformed as follows:

$$C_{init\_default} = n_{RNTI} \cdot 2^{N_1+N_3} + N_{ID}^{cell} \cdot 2^{N_3} + reserved$$

It should be understood that locations of A, B, and C may be interchanged based on an actual situation or importance of the parameters. The embodiments of this disclosure are not limited thereto.

It should be understood that M, N, and $N_3$ may be any value (including 0 and 127) ranging from 0 to 127. This embodiment of this disclosure is not limited to the foregoing example.

Optionally, the foregoing describes cases in which the second initial scrambling value is related to two or three of the cell identifier, the radio network temporary identifier, and the reserved bit. Optionally, the second initial scrambling value may alternatively be related to only one item of the cell identifier, the radio network temporary identifier, and the reserved bit. Specifically, when the second initial scrambling value is related to one item, the second initial scrambling value may be determined based on a formula similar to the foregoing formulas, or determined in a manner of determining the first initial scrambling value based on the scrambling identifier configured by using RRC, or a parameter of this item is directly used as the second initial scrambling value. The embodiments of this disclosure are not limited thereto.

Optionally, in another embodiment, the radio network temporary identifier is an RNTI, where the RNTI is related to a feature of data transmission of the terminal device. In other words, as the feature of data transmission of the terminal device varies, the RNTI may vary.

For example, in LTE, a PDSCH or PUSCH scheduled by using a PDCCH is related to the following eight types of RNTIs in total: In NR, more RNTIs may be defined for more output transmission. This is not limited in the present disclosure. 1. C-RNTI; 2. Temporary C-RNTI; 3. RA-RNTI; 4. P-RNTI; 5. SI-RNTI; 6. TPC-PUCCH-RNTI; 7. TPC-PUSCH-RNTI; and 8. SPS-RNTI.

The RNTI in the embodiments of this disclosure may be any one of the foregoing eight types. Among the eight types of RNTIs, the C-RNTI, the temporary C-RNTI, and the RA-RNTI are configured by using MAC. The P-RNTI and the SI-RNTI are fixed, and the rest are configured by using L3.

Specifically, a correspondence between the eight types of RNTIs and the feature of data transmission of the terminal device may be shown in Table 1.

TABLE 1

| RNTI | Function | DCI format corresponding to the RNTI |
|---|---|---|
| C-RNTI | Common uplink and downlink scheduling | Format 0, format 1, format 1A, format 1B, format 1D, format 2, and format 2A |
| Temporary C-RNTI | Temporary scheduling | Format 0 |
| RA-RNTI | Random access message | Format 1A and format 1C |
| P-RNTI | Paging message | Format 1A and format 1C |
| SI-RNTI | System message | Format 1A and format 1C |
| TPC-PUCCH-RNTI | PUCCH power control | Format 3/3A |
| TPC-PUSCH-RNT | PUSCH power control | Format 3/3A |
| SPS-RNTI | Persistent scheduling | Format 0, format 1, format 1A, format 2, and format 2A |

It should be noted that because the PDCCH includes dedicated space and common space, relationships between the RNTIs and the DCI are analyzed below based on the dedicated space and the common space.

RNTIs related to the dedicated space include: 1. C-RNIT, and 2. SPS-RNTI.

The DCI format corresponding to the C-RNTI includes: the format 0, the format 1, the format 1A, the format 1B, the format 1D, the format 2, and the format 2A.

The DCI format corresponding to the SPS-RNTI includes: the format 0, the format 1, the format 1A, the format 2, and the format 2A.

RNTIs related to the common space include: 1. C-RNTI; 2. Temporary C-RNTI; 3. RA-RNTI; 4. P-RNTI; 5. SI-RNTI; 6. TPC-PUCCH-RNTI; 7. TPC-PUSCH-RNTI; and 8. SPS-RNTI.

Based on the foregoing descriptions, the following information can be obtained:

1. The DCI format corresponding to the C-RNTI includes the format 0 and the format 1A.
2. The DCI format corresponding to the temporary C-RNTI includes the format 0.
3. The DCI format corresponding to the RA-RNTI includes the format 1A and the format 1C.
4. The DCI format corresponding to the P-RNTI includes the format 1A and the format 1C.
5. The DCI format corresponding to the SI-RNTI includes the format 1A and the format 1C.
6. The DCI format corresponding to the TPC-PUCCH-RNTI is the format 3/3A.
7. The DCI format corresponding to the TPC-PUSCH-RNTI is the format 3/3A.
8. The DCI format corresponding to the SPS-RNTI includes the format 0 and the format 1A.

Based on the foregoing correspondence between the RNTIs and DCI, the following classification may be performed: Because payload sizes of the format 0, the format 1A, and the format 3/3A are the same, DCI corresponding to these formats is classified into one type, and is referred to as first-type DCI. Payload sizes of other DCI are different from each other, and the other DCI is classified into one type, and is referred to as second-type DCI.

For first-type DCI (namely, the format 0/1A) of the dedicated space, the first-type DCI may not only be masked by using the C-RNTI, but also may be masked by using the SPS-RNTI. In other words, persistent scheduling may be used for both an uplink format 0 and a downlink format 1A. For second-type DCI of the dedicated space, the second-type DCI may also be masked by using the C-RNTI and the SPS-RNTI, but persistent scheduling may be used only for the format 1 and the format 2/2A. For first-type DCI of the common space, related RNTIs include the C-RNTI, the temporary C-RNTI, the RA-RNTI, the P-RNTI, the SI-RNTI, the TPC-PUCCH-RNTI, the TPC-PUSCH-RNTI, and the SPS-RNTI. It should be noted that the TPC-PUCCH-RNTI and the TPC-PUSCH-RNTI correspond only to the format 3/3A. In other words, a result obtained after de-masking is performed by using the TPC-PUCCH-RNTI and the TPC-PUSCH-RNTI is only the format 3/3A. The temporary C-RNTI corresponds only to the format 0, that is, the temporary C-RNTI is used only in an uplink. The SPS-RNTI corresponds to the format 0 and the format 1A. This is the same as the case of the dedicated space. The RA-RNTI, the P-RNTI, and the SI-RNTI all correspond to the format 1A. Second-type DCI (only the format 1C) of the common space includes only three pieces of DCI: the RA-RNTI, the P-RNTI, and the SI-RNTI, and DCI formats corresponding to the three pieces of DCI are the format 1C. Therefore, a correspondence between the RNTIs and the DCI shown in Table 2 may be obtained based on the foregoing descriptions.

TABLE 2

| | First-type DCI of the dedicated space (format 0/1A) | Second-type DCI of the dedicated space |
|---|---|---|
| RNTI | 1. C-RNTI<br>2. SPS-RNTI | 1. C-RNTI<br>2. SPS-RNTI (format 1 and format 2/2A) |
| | First-type DCI of the common space | Second-type DCI of the common space |
| | 1. C-RNTI<br>2. Temporary C-RNTI (format 0)<br>3. RA-RNTI (format 1A)<br>4. P-RNTI (format 1A)<br>5. SI-RNTI (format 1A)<br>6. TPC-PUCCH-RNTI (format 3/3A)<br>7. TPC-PUSCH-RNTI (format 3/3A)<br>8. SPS-RNTI | 1. RA-RNTI (format 1C)<br>2. P-RNTI (format 1C)<br>3. SI-RNTI (format 1C) |

It should be understood that, in Table 1 and Table 2, only LTE is used as an example to describe a related feature of the RNTI. During actual application, the RNTI may not be limited thereto. A definition of the RNTI in LTE may be inherited in NR, or may be changed. This may be specifically determined based on an actual situation. The embodiments of this disclosure are not limited thereto.

Therefore, in the embodiments of this disclosure, when determining that the higher layer is not configured with the scrambling identifier, the communications device scrambles or descrambles the data by using the second initial scrambling value. This resolves a problem in the prior art that a terminal device cannot determine an initial scrambling value used for data scrambling.

In another embodiment of this disclosure, in a joint transmission scenario shown in FIG. 2, for example, in a non-coherent joint transmission (e.g., non-coherent JT, NCJT) scenario, different network devices may transmit different scheduling information (PDCCHs or DCI) to a same terminal device on a same time-frequency resource in a same carrier, and the terminal device may feed back two pieces of different uplink information (for example, ACKs/NACKs and/or CSI) to the two network devices over PUCCHs. In this case, if an existing LTE technology is used, that is, only one virtual cell ID is configured, when time-frequency resources are the same, PUCCHs transmitted to two different cells have a same base sequence, and the terminal device can ensure, by using different cyclic shifts, that two pieces of uplink information are orthogonal. However, in this manner, capacities of the PUCCHs sent by the terminal device decrease.

Similarly, the terminal device also sends, in the foregoing manner, a DMRS used for PUCCH demodulation. To be specific, the terminal device determines a base sequence based on an ID (for example, a cell ID or an ID configured by a higher layer), perform cyclic shift to obtain a sequence, and sends the sequence over an uplink channel. Then, similarly, in this manner, a capacity of an uplink channel sent by the terminal device is reduced. Therefore, how to increase a capacity of the terminal device for multiplexing of PUCCHs becomes an urgent problem to be resolved.

In addition, it is stipulated in an existing standard that the terminal device needs to determine, based on a scrambling identifier configured by a higher layer, an initialized scrambling value used for data scrambling or descrambling. In the joint transmission scenario shown in FIG. 2, the terminal device may simultaneously receive downlink data sent by the two network devices over PDSCHs, or the terminal device may simultaneously send uplink data to the two network devices over PUSCHs. When the terminal device communicates with the two network devices, interference between signals is high if the terminal device scrambles or descrambles data by using only one scrambling identifier, affecting network performance.

In conclusion, it may be learned that in the existing solution, the terminal device feeds back DCI scheduling information by using one identifier (for example, the virtual cell ID) over a PUCCH. The terminal device also descrambles, by uses one identifier (for example, a scrambling identifier), downlink data received over a PDSCH, or scrambles uplink data sent over a PUSCH. However, in the foregoing two scenarios, a solution in which only one identifier is used for communication cannot meet a requirement of joint transmission, and network performance is affected.

For the foregoing problem, in the embodiments of this disclosure, two identifiers are configured for a terminal device by using higher layer signaling in the foregoing two scenarios, so that the terminal device may communicate with two network devices based on the two identifiers, to meet a requirement of joint transmission and improve network performance.

For ease of understanding and description, by way of example rather than limitation, an information transmission method in this disclosure is described in detail below.

Figure 4:
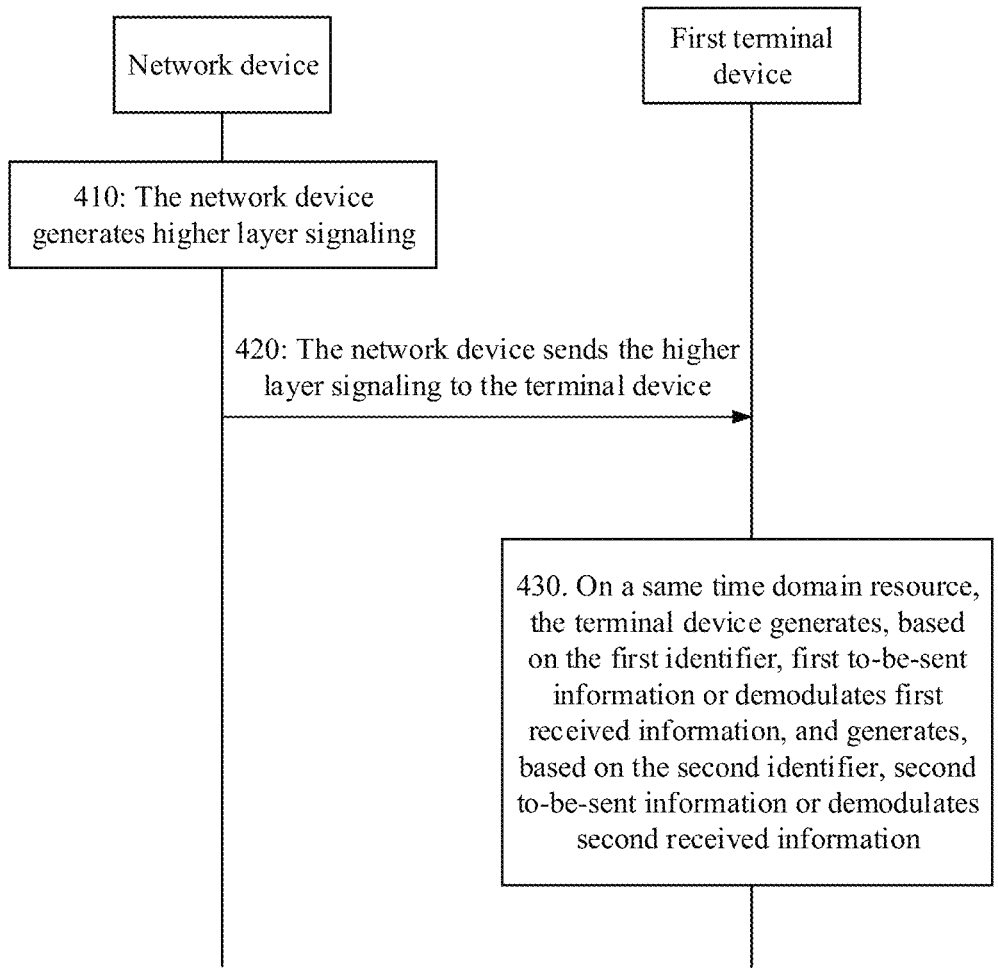
FIG. 4 is a schematic flowchart of an information transmission method according to another embodiment of this disclosure.

FIG. 4 is a schematic flowchart of an information transmission method 400 according to an embodiment of this disclosure. The method shown in FIG. 4 may be applied to the system architecture shown in FIG. 2. Specifically, the method 400 shown in FIG. 4 includes the following blocks.

410: A network device generates higher layer signaling.

Specifically, the higher layer signaling is used to indicate the first identifier and the second identifier.

For example, the higher layer signaling may be RRC signaling, and the network device may be any one of two network devices for joint transmission, or the network device may be another network device. The embodiments of this disclosure are not limited thereto. For example, the network device may be a network device that establishes an RRC connection to the terminal device.

420: The network device sends the higher layer signaling to the terminal device.

430: On a same time domain resource, the terminal device generates, based on the first identifier, first to-be-sent information or demodulates first received information, and generates, based on the second identifier, second to-be-sent information or demodulates second received information.

The first to-be-sent information or the first received information corresponds to a first antenna port or a first antenna port set, the second to-be-sent information or the second received information corresponds to a second antenna port or a second antenna port set, and the first antenna port or the first antenna port set and the second antenna port or the second antenna port set are in a non-quasi co-location (non-QCL) relationship.

It should be understood that the first antenna port or the first antenna port set may correspond to a first network device, and the second antenna port or the second antenna port set may correspond to a second network device.

In other words, on the same time domain resource, the terminal device may communicate with the first network device by using the first identifier, and communicate with the second network device by using the second identifier.

Specifically, after the terminal device obtains the first identifier and the second identifier by using the higher layer signaling, on the same time domain resource (for example, a same slot), the terminal device communicates with the first network device by using the first identifier, for example, sends the first to-be-sent information or receives the first received information, and communicates with the second network device by using the second identifier, for example, sends the second to-be-sent information or receives the second received information.

Therefore, in the embodiments of this disclosure, the two identifiers are configured by using the higher layer signaling, so that the terminal device may communicate with the two network devices based on the two identifiers, to meet a requirement of joint transmission and improve network performance.

It should be understood that the foregoing describes a case in which two identifiers are configured for the terminal device. Optionally, when the terminal device communicates with three or more network devices at the same time, the network device may also configure three or more identifiers, so that the terminal device communicates with the three or more terminal devices on a same time domain resource. The embodiments of this disclosure are not limited thereto.

Optionally, in another embodiment, the first to-be-sent information or the first received information and the second to-be-sent information or the second received information may each include at least one of the following information: downlink shared channel PDSCH data information, uplink shared channel PUSCH data information, downlink control channel PDCCH information, an uplink control channel PUCCH, an uplink sounding channel SRS, an uplink random access channel PRACH, an uplink or downlink demodulation reference signal DMRS, a downlink channel measurement reference signal CSI-RS, downlink phase tracking information PTRS, or a downlink tracking signal TRS.

For ease of description, the following separately describes the information transmission method in the embodiments of this disclosure with reference to a scenario (referred to as a scenario 1 below) in which the terminal device performs feedback on scheduling of a plurality of pieces of DCI in a joint transmission scenario and an uplink/downlink data transmission scenario (referred to as a scenario 2 below) in the joint transmission scenario.

First, the information transmission method in the scenario 1 is described.

To make the solution in the scenario 1 in the embodiments of this disclosure easier to understand, the following describes related content of a sequence generation identifier in the embodiments of this disclosure.

A PUCCH format 1a corresponds to 1-bit transmission bit $b(0), \ldots, b(M_{bit}-1)$, and a PUCCH 1b corresponds to 2-bit (bit) transmission bit $b(0), \ldots, b(M_{bit}-1)$. The transmission bits may correspond to an ACK, a NACK, UCI, CSI, and the like scheduled by using DCI. The bit block $b(0), \ldots, b(M_{bit}-1)$ is modulated into a complex-valued symbol $d(0)$ by using Table 3 (corresponding to Table 5.4.1-1 in an existing standard). For a specific modulation scheme, refer to Table 5.4-1 in the standard. Details are not described herein again.

TABLE 3

| PUCCH format (format) | $b(0), \ldots, b(M_{bit} - 1)$ | $d(0)$ |
|---|---|---|
| 1a | 0 | 1 |
|  | 1 | −1 |
| 1b | 00 | 1 |
|  | 01 | −j |

TABLE 3-continued

| PUCCH format (format) | b(0), . . . , b(M$_{bit}$ − 1) | d(0) |
|---|---|---|
| | 10 | j |
| | 11 | −1 |

A PUCCH transmission signal of the terminal device through each antenna port is obtained after the complex-valued symbol d(0) is multiplied by a cyclic shift sequence $r_{u,v}^{(\alpha_{\tilde{p}})}(n)$ whose length is 12. Specifically, a transmission signal $y^{(\tilde{p})}(n)$ may be determined based on the following formula:

$$y^{(\tilde{p})}(n) = \frac{1}{\sqrt{P}} d(0) \cdot r_{u,v}^{(\alpha_{\tilde{p}})}(n),$$

$$n = 0, 1, \ldots, N_{seq}^{PUCCH} - 1,$$

where $r_{u,v}^{(\alpha_{\tilde{p}})}(n)$ is an uplink reference signal sequence, and is obtained after cyclic shift is performed on a base sequence $\bar{r}_{u,v}(n)$.

The base sequence $\bar{r}_{u,v}(n)$ may be generated based on a length of the base sequence in the following two cases: (1) The length of the base sequence is greater than or equal to $3N_{sc}^{RB}$; or (2) The length of the base sequence is less than $3N_{sc}^{RB}$.

(1) The length of the base sequence is greater than or equal to $3N_{sc}^{RB}$ (where $N_{sc}^{RB}$ is a quantity of subcarriers included in one RB): The base sequence $\bar{r}_{u,v}(0), \ldots, \bar{r}_{u,v}(M_{sc}^{RS}-1)$ is obtained by using the following formula:

$$\bar{r}_{u,v}(n) = x_q(n \bmod N_{ZC}^{RS}), 0 \leq n < M_{sc}^{RS},$$

where $M_{sc}^{RS}$ is a length (a quantity of subcarriers) of a reference signal, $N_{ZC}^{RS}$ is a maximum prime number less than or equal to $M_{sc}^{RS}$, and a $q^{th}$ root Zadoff-Chu sequence is indicated by this formula:

$$x_q(m) = e^{-j\frac{\pi q m(m+1)}{N_{ZC}^{RS}}}, 0 \leq m \leq N_{ZC}^{RS} - 1,$$

where q is:

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31$$

(2) The length of the base sequence is less than $3N_{sc}^{RB}$: For $M_{sc}^{RS}=N_{sc}^{RB}$ and $M_{sc}^{RS}=2N_{sc}^{RB}$, the base sequence is calculated based on the following formula:

$$\bar{r}_{u,v}(n) = e^{j\varphi(n)\pi/4}, 0 \leq n \leq M_{sc}^{RS}-1$$

$\alpha(n)$ corresponding to $M_{sc}^{RS}=N_{sc}^{RB}$ is given in Table 4 (corresponding to Table 5.5.1.2-1 in the standard), and $\varphi(n)$ corresponding to $M_{sc}^{RS}=2N_{sc}^{RB}$ is given in Table 5 (corresponding to Table 5.5.1.2-2 in the standard).

TABLE 4

Definition of $\varphi(n)$ when $M_{sc}^{RS} = N_{sc}^{RB}$

| u | $\varphi(0), \ldots, \varphi(11)$ |
|---|---|
| 0 | −1  1  3 −3  3  3  1  1  3  1 −3  3 |
| 1 |  1  1  3  3  3 −1  1 −3 −3  1 −3  3 |
| 2 |  1  1 −3 −3 −3 −1 −3 −3  1 −3  1 −1 |
| 3 | −1  1  1  1  1 −1 −3 −3  1 −3  3 −1 |
| 4 | −1  3  1 −1  1 −1 −3 −1  1 −1  1  3 |
| 5 |  1 −3  3 −1 −1  1  1 −1 −1  3 −3  1 |
| 6 | −1  3 −3 −3 −3  3  1 −1  3  3 −3  1 |
| 7 | −3 −1 −1 −1  1 −3  3 −1  1 −3  3  1 |
| 8 |  1 −3  3  1 −1 −1 −1  1  1  3 −1  1 |
| 9 |  1 −3 −1  3  3 −1 −3  1  1  1  1  1 |
| 10 | −1  3 −1  1  1 −3 −3 −1 −3 −3  3 −1 |
| 11 |  3  1 −1 −1  3  3 −3  1  3  1  3  3 |
| 12 |  1 −3  1  1 −3  1  1  1 −3 −3 −3  1 |
| 13 |  3  3 −3  3 −3  1  1  3 −1 −3  3  3 |
| 14 | −3  1 −1 −3 −1  3  1  3  3  3 −1  1 |
| 15 |  3 −1  1 −3 −1 −1  1  1  3  1 −1 −3 |
| 16 |  1  3  1 −1  1  3  3  3 −1 −1  3 −1 |
| 17 | −3  1  1  3 −3  3 −3 −3  3  1  3 −1 |
| 18 | −3  3  1  1 −3  1 −3 −3 −1 −1  1 −3 |
| 19 | −1  3  1  3  1 −1 −1  3 −3 −1 −3 −1 |
| 20 | −1 −3  1  1  1  1  3  1 −1  1 −3 −1 |
| 21 | −1  3 −1  1 −3 −3 −3 −3 −3  1 −1 −3 |
| 22 |  1  1 −3 −3 −3 −3 −1  3 −3  1 −3  3 |
| 23 |  1  1 −1 −3 −1 −3  1 −1  1  3 −1  1 |
| 24 |  1  1  3  1  3  3 −1  1 −1 −3 −3  1 |
| 25 |  1 −3  3  3  1  3  3  1 −3 −1 −1  3 |
| 26 |  1  3 −3 −3  3 −3  1 −1 −1  3 −1 −3 |
| 27 | −3 −1 −3 −1 −3  3  1 −1  1  3 −3 −3 |
| 28 | −1  3 −3  3 −1  3  3 −3  3  3 −1 −1 |
| 29 |  3 −3 −3 −1 −1 −3 −1  3 −3  3  1 −1 |

TABLE 5

Definition of $\varphi(n)$ when $M_{sc}^{RS} = 2N_{sc}^{RB}$

| u | $\varphi(0), \ldots, \varphi(23)$ |
|---|---|
| 0  | −1  3  1 −3  3 −1  1  3 −3  3  1  3 −3  3  1  1 −1  1  3 −3  3 −3 −1 −3 |
| 1  | −3  3 −3 −3 −3  1 −3 −3  3 −1  1  1  1  3  1 −1  3 −3 −3  1  3  1  1 −3 |
| 2  |  3 −1  3  3  1  1 −3  3  3  3  3  1 −1  3 −1  1  1 −1 −3 −1 −1  1  3  3 |
| 3  | −1 −3  1  1  3 −3  1  1 −3 −1 −1  1  3  1  3  1 −1  3  1  1 −3 −1 −3 −1 |
| 4  | −1 −1 −1 −3 −3 −1  1  1  3  3 −1  3 −1  1 −3  1 −1 −3 −3  1 −3 −1 −1 −1 |
| 5  | −3  1  1  3 −1  1  3  1 −3  1 −3  1  1 −1 −1  3 −1 −3  3 −3 −3 −3  1  1 |
| 6  |  1  1 −1 −1  3 −3 −3  3 −3  1 −1 −1  1 −1  1  1 −1 −3 −1  1 −1  3 −1 −3 |
| 7  | −3  3  3 −1 −1 −3 −1  3  1  3  1  3  1  1 −1  3  1 −1  1  3 −3 −1 −1  1 |
| 8  | −3  1  3 −3  1 −1 −3  3 −3  3 −1 −1 −1 −1  1 −3 −3 −3  1 −3 −3 −3  1 −3 |
| 9  |  1  1 −3  3  3 −1 −3 −1  3 −3  3  3  3 −1  1  1 −3  1 −1  1  1 −3  1  1 |
| 10 | −1  1 −3 −3  3 −1  3 −1 −1 −3 −3 −3 −1 −3 −3  1 −1  1  3  3 −1  1 −1  3 |
| 11 |  1  3  3 −3 −3  1  3  1 −3 −3 −3  3  3 −3  3  3 −1 −3  3 −1  1 −3  1  1 |
| 12 |  1  3  3  1  1  1 −1 −1  1 −3  3 −1  1  1 −3  3  3 −1 −3  3 −3 −1 −3 −1 |
| 13 |  3 −1 −1 −1 −1 −3 −1  3  3  1 −1  1  3  3  3 −1  1  1 −3  1  3 −1 −3  3 |

TABLE 5-continued

Definition of $\varphi(n)$ when $M_{sc}^{RS} = 2N_{sc}^{RB}$

| u | $\varphi(0), \ldots, \varphi(23)$ |
|---|---|
| 14 | −3 −3  3  1  3  1 −3  3  1  3  1  1  3  3 −1 −1 −3  1 −3 −1  3  1  1  3 |
| 15 | −1 −1  1 −3  1  3 −3  1 −1 −3 −1  3  1  3  1 −1 −3 −3 −1 −1 −3 −3 −3 −1 |
| 16 | −1 −3  3 −1 −1 −1 −1  1  1 −3  3  1  3  3  1 −1  1 −3  1 −3  1  1 −3 −1 |
| 17 |  1  3 −1  3  3 −1 −3  1 −1 −3  3  3 −1  1  1  3 −1 −3 −1  3 −1 −1 −1  1 |
| 18 |  1  1  1  1  1 −1  3 −1 −3  1  1  3 −3  1 −3 −1  1  1 −3 −3  3  1  1 −3 |
| 19 |  1  3  3  1 −1 −3  3 −1  3  3  3 −3  1 −1  1 −1 −3 −1  1  3 −1  3 −3 −3 |
| 20 | −1 −3  3 −3 −3 −3 −1 −1 −3 −1 −3  3  1  3 −3 −1  3 −1  1 −1  3 −3  1 −1 |
| 21 | −3 −3  1  1 −1  1 −1  1 −1  3  1 −3 −1  1 −1  1 −1 −1  3  3 −3 −1  1 −3 |
| 22 | −3 −1 −3  3  1 −3 −1 −3 −3  3 −3  3 −1 −1  3  1  3  1  3  3 −1  3 −1 −3 |
| 23 | −1 −1 −1 −1  3  3  3  1  3  3 −3  1  3 −1  3 −1  3  3 −3  3  1 −1  3  3 |
| 24 |  1 −1  3  3 −1 −3  3 −3 −1 −1  3 −1  3 −1 −1  1  1  1  1 −1 −1 −3 −1  3 |
| 25 |  1 −1  1 −1  3 −1  3  1  1 −1 −1 −3  1  1 −3  1  3 −3  1  1 −3 −3 −1 −1 |
| 26 | −3 −1  1  3  1  1 −3 −1 −1 −3  3 −3  3  1 −3  3 −3  1 −1  1 −3  1  1  1 |
| 27 | −1 −3  3  3  1  1  3 −1 −3 −1 −1 −1  3  1 −3 −3 −1  3 −3 −1 −3 −1 −3 −1 |
| 28 | −1 −3 −1 −1  1 −3 −1 −1  1 −1 −3  1  1 −3  1 −3 −3  3  1  1 −1  3 −1 −1 |
| 29 |  1  1 −1 −1 −3 −1  3 −1  3 −1  1  3  1 −1  3  1  3 −3 −3  1 −1 −1  1  3 |

For each reference signal sequence length, at least 30 base sequences may be used. These sequences are divided into 30 groups. A value range of the groups is from 0 to 29 (where that a value of u is from 0 to 29 corresponds to the 30 base sequences). For a base sequence of a reference signal whose length is greater than or equal to 72, a quantity of available base sequences is greater than 60. In this case, each group includes two base sequences (where this is a meaning of v, and a value of v is 0 or 1).

In this case, a formula for calculating a group (group number) u used in each slot is as follows:

$$u = (f_{gh}(n_s) + f_{ss}) \bmod 30,$$

where $f_{gh}(n_s)$ is group hopping, and may be further represented by using the following formula:

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hoping is enabled} \end{cases}$$

Herein, an initial value of c is $$c_{init} = \left\lfloor \frac{n_{ID}^{RS}}{30} \right\rfloor.$$

$f_{ss}$ is a sequence-shift pattern, and $f_{ss}$ has different definitions when $f_{ss}$ corresponds to a PUCCH, a PUSCH, and an SRS. For the PUCCH, the definition is as follows:

$$f_{ss}^{PUCCH} = n_{ID}^{RS} \bmod 30$$

$n_{ID}^{RS}$ is a virtual cell ID used to determine generation of a sequence. For PUCCH transmission, a definition is as follows:

$n_{ID}^{RS} = N_{ID}^{cell}$, if no value for $n_{ID}^{PUCCH}$ is configured by a higher layer (if no value for $n_{ID}^{PUCCH}$ is configured by higher layers); or $n_{ID}^{RS} = n_{ID}^{PUCCH}$ otherwise (otherwise).

Therefore, u corresponds to a given cell ID, so that the base sequence $\bar{r}_{u,v}(n)$ and the uplink reference signal sequence $r_{u,v}^{(\alpha_{\tilde{p}})}(n)$ correspond to the given cell ID. To be specific, $y^{(\tilde{p})}(n)$ output through an antenna port corresponds to the given cell ID, and only one cell ID is defined in LTE, that is, there is no case in which $y^{(\tilde{p})}(n)$ is determined based on a plurality of cell IDs.

It may be learned from the foregoing analysis that the terminal device needs to determine the cyclic shift sequence to transmit feedback information through a PUCCH, but the cyclic shift sequence is obtained after cyclic shift is performed on the base sequence. In addition, the base sequence corresponds to the sequence generation identifier (the sequence generation identifier is a value or cell ID configured by the higher layer). Therefore, only provided that the sequence generation identifier is determined, the feedback information may be determined based on a process that is opposite to that described above.

It should be understood that the above described the method for sending information such as the ACK, the NACK, the UCI, and the CSI. Optionally, a DMRS that is transmitted over a PUCCH and that is used for demodulation may be sent in a similar manner.

Therefore, based on the above analysis, in the embodiments of this disclosure, two sequence generation identifiers are configured in the scenario 1 to transmit the feedback information over the PUCCH, so as to meet the requirement of the joint transmission, and improve the network performance.

Correspondingly, in another embodiment, the first identifier is a first sequence generation identifier, the first sequence generation identifier is used to determine a first base sequence, the second identifier is a second sequence generation identifier, and the second sequence generation identifier is used to determine a second base sequence. In 430, the terminal device determines the first base sequence based on the first sequence generation identifier, and determines the second base sequence based on the second sequence generation identifier. The terminal device performs cyclic shift on the first base sequence to generate a third sequence, and performs cyclic shift on the second base sequence to generate a fourth sequence. On the same time domain resource, the terminal device sends, to the first network device over a first physical uplink control channel PUCCH, data feedback information corresponding to the third sequence, and sends, to the second network device over a second PUCCH, data feedback information corresponding to the fourth sequence. The first to-be-sent information is the data feedback information corresponding to the third sequence, and the second to-be-sent information is the data feedback information corresponding to the fourth sequence.

Optionally, in another embodiment, the higher layer signaling is used to configure a time-frequency resource occupied by the first PUCCH, the first sequence generation identifier used for the data feedback information transmitted over the first PUCCH, a time-frequency resource occupied by the second PUCCH, and the second sequence generation identifier used for the data feedback information transmitted over the second PUCCH.

It should be understood that, in the embodiments of this disclosure, higher layer signaling for configuring the first PUCCH and the second PUCCH may be same higher layer signaling (for example, RRC signaling), or may be different higher layer signaling (for example, RRC signaling). The embodiments of this disclosure are not limited thereto.

It should be understood that the foregoing describes a solution in which the corresponding sequence generation identifiers are configured when there are two PUCCHs and when the PUCCH resources are configured by using the higher layer signaling. Optionally, similarly, in the embodiments of this disclosure, different quantities of PUCCHs may be considered. To be specific, when a PUCCH resource is configured by a higher layer, a sequence generation identifier (which may also be referred to as a sequence generation identifier corresponding to the PUCCH) used for data feedback information transmitted on the PUCCH resource is also configured.

Optionally, in another embodiment, the method may further include: The terminal device receives first downlink control information DCI transmitted on a first PDCCH resource and second DCI transmitted on a second PDCCH resource. The data feedback information carried by the first PUCCH corresponds to data scheduled by using the first DCI, the data scheduled by using the first DCI corresponds to the first antenna port or the first antenna port set, the data feedback information carried by the second PUCCH corresponds to data scheduled by using the second DCI, and the data scheduled by using the second DCI corresponds to the second antenna port or the second antenna port set.

For example, the higher layer signaling is RRC signaling. The RRC signaling is used to configure a plurality of PUCCH resources and sequence generation identifiers used on the plurality of PUCCH resources. The plurality of PUCCH resources include the first PUCCH resource and the second PUCCH resource.

Specifically, content of each PUCCH resource configured by using the RRC signaling may include: a slot number and a symbol number that are in time domain, a quantity of RBs in frequency domain, a quantity of cyclic shifts used in code domain, and a sequence generation identifier required during sequence generation.

Specifically, the RRC signaling is used to configure a time-frequency resource occupied by the first PUCCH, the first sequence generation identifier used on the time-frequency resource of the first PUCCH, a time-frequency resource occupied by the second PUCCH, and the second sequence generation identifier used on the time-frequency resource of the second PUCCH.

For example, when two network devices simultaneously send a plurality of pieces of DCI to schedule a terminal device, the two network devices may interact through an X2 interface, to divide PUCCH resources into two groups (for example, a PUCCH group 1 and a PUCCH group 2) that are orthogonal to each other. After grouping, the network devices configure PUCCH resources by using RRC signaling. For example, as shown in Table 6, the terminal device configures four groups of PUCCH parameters for the UE by using the RRC signaling, and triggers, by using two bits in the DCI, one group of PUCCH resources used by the terminal. A specific configuration design is shown in the following table.

TABLE 6

| Value of a PUCCH request field (Value of PUCCH request field) | Description (Description) |
| --- | --- |
| '00' | PUCCH resource 0 |
| '01' | PUCCH resource 1 |
| '10' | PUCCH resource 2 |
| '11' | PUCCH resource 3 |

As shown in Table 6, the PUCCH request fields '00' and '01' that are corresponding to the two bits in the DCI correspond to two different resources that are orthogonal to each other and that are in the PUCCH group 1, namely, the PUCCH resource 0 and the PUCCH resource 1, and both correspond to a network device 1/sequence generation identifier (ID) 1. The PUCCH request field '00' corresponds to the PUCCH group 1 and the network device 1/sequence generation ID 1, and the PUCCH request field '10' corresponds to the PUCCH group 2 and a network device 2/sequence generation ID 2. Therefore, content of each group of PUCCH resources configured by using the RRC signaling includes: a slot number and a symbol number that are in time domain, a quantity of RBs in frequency domain, a quantity of cyclic shifts used in code domain, and a sequence generation ID required for generating a base sequence. It can be learned from the designed table that each group of PUCCH resources corresponds to one sequence generation ID.

For example, the terminal device receives the first DCI sent by the first network device and the second DCI sent by the second network device, and then determines, based on the first DCI and the second DCI, PUCCH resources such as a PUCCH resource 0 and a PUCCH resource 2, and separately sends the feedback information on the PUCCH resources. Specifically, the terminal device sends the feedback information on the PUCCH resource 0 by using the first sequence generation identifier, and sends the feedback information on the PUCCH resource 2 by using the second sequence generation identifier.

Therefore, in the foregoing scenario 1, when the terminal device sends a plurality of PUCCHs to different network devices, for example, when two network devices simultaneously schedule a same terminal device, and PUCCH resources of the terminal device are directly configured by using RRC signaling, the two network devices add, to the RRC signaling, a sequence generation identifier corresponding to each group of PUCCH resources, to ensure that the PUCCHs sent by the terminal device to the two network devices use different base sequences, so as to ensure that PUCCH sequences multiplex a capacity of the terminal device. This implements relatively small interference between two PUCCHs transmitted to the two network devices, and improves network performance.

For the scenario 1, the foregoing describes a solution in which the network device configures the sequence generation identifiers while configuring the PUCCH resources by using RRC.

Optionally, in the embodiments of this disclosure, for the foregoing scenario 1, the sequence generation identifiers may be further configured when the PDCCH resources are configured by using RRC.

Correspondingly, in another embodiment, the higher layer signaling is used to indicate a control resource set corresponding to a physical downlink control channel PDCCH, the first sequence generation identifier used for the data feedback information transmitted on a PUCCH resource corresponding to a first PDCCH resource in the control resource set, and the second sequence generation identifier used for the data feedback information transmitted on a second PDCCH resource.

It should be understood that the control resource set (control resource set) in the embodiments of this disclosure is defined as follows:

Control channels may be divided into a plurality of control resource sets, and each control resource set is a set of REGs. The terminal device may listen to the PDCCH on one or more control resource sets. In the embodiments of the present disclosure, for the network device, the control resource sets may be understood as resources occupied for sending the control channels. For the terminal device, each search space of the PDCCH of the terminal device belongs to the control resource set. In other words, the network device may determine, in the control resource set, the resource used for sending the PDCCH, and the terminal device may determine the search space of the PDCCH in the control resource set. The control resource set may include a time-frequency resource. For example, the time-frequency resource may be a segment of bandwidth or one or more subbands in frequency domain; may be a quantity of time units in time domain, for example, a quantity of symbols in a subframe, a slot, or a mini-slot; or may be contiguous or discontiguous resource elements in time-frequency domain, for example, contiguous resource blocks (RB) or discontiguous RBs.

It should be understood that specific content of the foregoing enumerated frequency domain resource, time domain resource, and time-frequency domain resource is merely used as an example for description, and should not be construed as any limitation on the embodiments of the present disclosure. For example, an RB may be defined as a resource defined in an existing LTE protocol, or may be a resource defined in a future protocol, or may be replaced with another name. For another example, the time unit may be a subframe; or may be a slot; or may be a radio frame, a mini-slot (e.g., mini slot or sub slot), a plurality of aggregated slots, a plurality of aggregated subframes, a symbol, or the like; or may even be a transmission time interval (TI). This is not specifically limited in the embodiments of this disclosure.

Therefore, in the scenario 1, when independent scheduling is performed by using a plurality of pieces of DCI, to be specific, when each network device independently sends one PDCCH to a same terminal device, each PDCCH occupies a different CORESET. This is configured by using RRC signaling. In this case, DCI carried in the CORESET is used to schedule downlink data, and a PUCCH corresponding to the DCI may use a sequence generation ID configured in the CORESET.

For example, when the CORESET is configured by using the RRC signaling, the generation ID is also generated, so that an ID used by the PUCCH corresponding to the DCI in the CORESET may be determined.

The foregoing separately describes solutions of configuring the sequence generation identifier when the PUCCH resource is configured by using the RRC signaling in scenario 1, and configuring the sequence generation identifier when the PDCCH resource is configured by using the RRC signaling in scenario 1.

Optionally, in the embodiments of this disclosure, the two sequence generation identifiers may alternatively be directly configured by using the higher layer signaling.

Correspondingly, in another embodiment, the higher layer signaling is further used to indicate a correspondence between the first sequence generation identifier and the first PUCCH and a correspondence between the second sequence generation identifier and the second PUCCH.

Specifically, the network device may directly configure the two sequence generation identifiers for the terminal device by using the higher layer signaling. In addition, a correspondence between the sequence generation identifiers and two PUCCHs in a same slot is indicated in the higher layer signaling.

For example, if the two PUCCHs in the same slot are respectively a short PUCCH and a long PUCCH, RRC signaling is used to configure that the short PUCCH uses a sequence generation ID 1, and the ID 1 may use a serving cell ID; and RRC signaling is used to configure that the long PUCCH uses a sequence generation ID 2, and the ID 2 may use a coordinating cell ID.

According to the method in the embodiments of this disclosure, it may be ensured that the two PUCCHs in the same slot do not interfere with each other, and when the two PUCCHs are simultaneously scheduled by a plurality of base stations, sent resources do not affect each other.

It should be understood that in the scenario 1, the two identifiers configured by using the higher layer signaling may be the same or may be different. The embodiments of this disclosure are not limited thereto.

For example, when there are a plurality of network devices in a same cell (in other words, cell IDs of the plurality of network devices are the same), configured sequence generation Ids are configured to be a same ID by using the higher layer signaling, to implement PUCCH transmission in this scenario. Because scheduling is performed by the plurality of network devices, it may be considered that sent PUCCHs use different base sequences, so that the PUCCHs are orthogonal, and mutual interference is avoided.

According to the method in the embodiments of this disclosure, configuration performed by using the higher layer signaling is more flexible, and a requirement of a 5G (NR) dense base station scenario can be met.

The foregoing describes a case in which the feedback information corresponding to the DCI is transmitted over the PUCCHs in scenario 1. Similarly, the terminal device also sends, in the foregoing manner, a DMRS used for PUCCH demodulation. In other words, in the embodiments of this disclosure, two IDs may also be configured by using higher layer signaling, so that the terminal device determines sequences based on the foregoing similar process, and separately sends the sequences by using two uplink channels. For a specific process, refer to the foregoing descriptions. To avoid repetition, details are not described herein again.

The foregoing describes the information transmission method in the scenario 1, and the following describes an information transmission method in the scenario 2 (the uplink/downlink data transmission scenario in the joint transmission scenario).

Specifically, in another embodiment, the first identifier is a first scrambling identifier, the second identifier is a second scrambling identifier, the first scrambling identifier is used by the terminal device to determine a first initialized scrambling value used for data scrambling, and the second scrambling identifier is used by the terminal device to determine a second initialized scrambling value used for data scrambling;

in 430, the terminal device generates the first initialized scrambling value by using the first scrambling identifier, and generates the second initialized scrambling value by using the second scrambling identifier; and on a same time domain resource, the terminal device generates, by using the first identifier, first to-be-sent information or demodulates first received information, and generates, by using the second identifier, second to-be-sent information or demodulates second received information.

In other words, on the same time domain resource, the terminal device communicates with the first network device by using the first initialized scrambling value, and communicates with the second network device by using the second initialized scrambling value.

Specifically, the network device configures at least two different scrambling identifiers for the terminal device by using higher layer signaling, so that the terminal device may separately scramble, by using the two scrambling identifiers, uplink data transmitted to the two network devices. Alternatively, the terminal device may separately descramble, by using the two data scrambling identifiers, received downlink data sent by the two network devices.

It should be understood that, in the embodiments of this disclosure, two scrambling identifiers used for PDSCH transmission may be the same as two scrambling identifiers used for PUSCH transmission, that is, the two scrambling identifiers are shared. Optionally, the two scrambling identifiers used for PDSCH transmission and the two scrambling identifiers used for PUSCH transmission may alternatively be separately configured.

Optionally, in another embodiment, the higher layer signaling is further used to indicate a correspondence between the first scrambling identifier and the first antenna port or the first antenna port group, and a correspondence between the second scrambling identifier and the second antenna port or the second antenna port group.

It should be understood that the first antenna port or the first antenna port group corresponds to the first network device, and the second antenna port or the second antenna port group corresponds to the second network device.

Specifically, the network device directly configures two scrambling identifiers for the terminal device by using higher layer signaling, and indicates, in the higher layer signaling, a one-to-one correspondence between the two scrambling identifiers and two antenna ports or two antenna port groups in a same slot. In addition, the two antenna ports or antenna port groups are not QCL-ed. In other words, the two antenna port groups may correspond to the two network devices.

It should be understood that, in the embodiments of this disclosure, the antenna port may be a DMRS antenna port, a PTRS antenna port, or a TRS antenna port. The antenna port group may be a DMRS antenna port group, a PTRS antenna port group, or a TRS antenna port group. The embodiments of this disclosure are not limited thereto.

Therefore, the terminal device may separately scramble, based on the two scrambling identifiers, uplink data transmitted to the two network devices. Alternatively, the terminal device may separately descramble, by using the two data scrambling identifiers, received downlink data sent by the two network devices.

Therefore, in the embodiments of this disclosure, when communicating with the two network devices, the terminal device separately scrambles or descrambles data communicated with the two network devices by using the two scrambling identifiers. Therefore, interference between signals is reduced, and the network performance is improved.

It should be understood that, examples in FIG. 1 to FIG. 4 above are merely intended to help a person skilled in the art understand the embodiments of the present disclosure, but are not intended to limit the embodiments of the present disclosure to a specific value or a specific scenario in the examples. A person skilled in the art apparently can make various equivalent modifications or changes based on the examples shown in FIG. 1 to FIG. 4, and such modifications or changes also fall within the scope of the embodiments of the present disclosure.

It should be understood that sequence numbers of the foregoing processes do not mean execution sequences in various embodiments of this disclosure. The execution sequences of the processes should be determined based on functions and internal logic of the processes, and should not be construed as any limitation on the implementation processes of the embodiments of this disclosure.

The foregoing describes in detail the information transmission method in the embodiments of the present disclosure with reference to FIG. 1 to FIG. 4. The following describes devices in the embodiments of the present disclosure with reference to FIG. 5 to FIG. 7.

Figure 5:
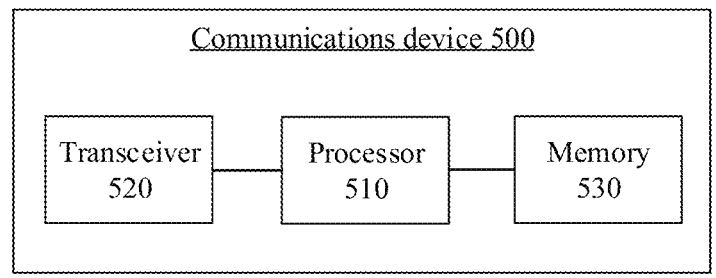
FIG. 5 is a schematic block diagram of a communications device according to an embodiment of this disclosure.

FIG. 5 is a schematic block diagram of a communications device 500 according to an embodiment of this disclosure. Specifically, as shown in FIG. 5, the communications device 500 includes a processor 510. Optionally, the communications device 500 may further include a transceiver 520, and the transceiver 520 may send or receive a signal or data.

Optionally, the communications device may further include a component such as a memory 530. The memory is mainly configured to store a software program and the data. The processor 510 may read the software program in the memory, interpret and execute an instruction of the software program, and process data of the software program.

The communications device 500 may be a network device or a terminal device.

When the communications device 500 is a network device, optionally, the transceiver 520 may be referred to as a remote radio unit (RRU), a transceiver unit, a transceiver, a transceiver circuit, or the like. The transceiver 520 may include at least one antenna and a radio frequency unit, and the transceiver 520 may be configured to: transmit and receive a radio frequency signal, and perform conversion between the radio frequency signal and a baseband signal. Optionally, the network device may include a baseband unit (BBU), and the baseband unit includes the processor 510. The baseband unit may be configured to: perform baseband processing such as channel coding, multiplexing, modulation, or spectrum spreading, and control the network device. The transceiver 520 and the baseband unit may be physically disposed together; or may be physically disposed separately, that is, the network device is a distributed network device.

In an example, the baseband unit may include one or more boards, and the plurality of boards may jointly support a radio access network of a single access standard, or may support radio access networks of different access standards.

In an example, the baseband unit may be reconstructed as the foregoing DU function entity and the foregoing CU function entity.

The baseband unit includes the processor 510. The processor 510 may be configured to control the network device to perform corresponding operations in the foregoing method embodiments. Optionally, the baseband unit may further include a memory, and the memory is configured to store a necessary instruction and necessary data.

When the communications device 500 is a terminal device, optionally, the transceiver 520 may include a control circuit and an antenna. The control circuit may be configured to: perform conversion between a baseband signal and a radio frequency signal, and process the radio frequency signal; and the antenna may be configured to receive and send the radio frequency signal. The processor 510 may be configured to: process a communication protocol and communication data, control the entire communications device, execute a software program, and process data of the software program, for example, configured to support the communications device in performing corresponding operations in the foregoing method embodiments.

Specifically, the processor 510 is configured to: when determining that higher layer signaling is not configured with a scrambling identifier, scramble or descramble data by using a second initial scrambling value, where the scrambling identifier is used by the communications device to determine a first initial scrambling value used for data scrambling or descrambling, and the second initial scrambling value is related to at least one or two of a cell identifier, a radio network temporary identifier, and a reserved bit.

Therefore, in the embodiments of this disclosure, when determining that the higher layer is not configured with the scrambling identifier, the communications device scrambles or descrambles the data by using the second initial scrambling value. This resolves a problem in the prior art that a terminal device cannot determine an initial scrambling value used for data scrambling.

Optionally, in another embodiment, a payload size of the second initial scrambling value is the same as a payload size of the first scrambling identifier; or a payload size of the second initial scrambling value is the same as a payload size of the first initial scrambling value.

Optionally, in another embodiment, the second initial scrambling value is related to the cell identifier and the radio network temporary identifier, and the second initial scrambling value is determined by the processor based on the following formula:

$$C_{init\ default}=A*2^N+B,$$

where $C_{init\ default}$ represents the second initial scrambling value, A represents one of the cell identifier and the radio network temporary identifier, B represents the other one of the cell identifier and the radio network temporary identifier, and N is any integer ranging from 0 to 127.

Optionally, in another embodiment, the second initial scrambling value is related to the cell identifier, the radio network temporary identifier, and the reserved bit, and the second initial scrambling value is determined by the processor based on the following formula:

$$C_{init\ default}=A*2^{N+M}+B*2^M+C,$$

where $C_{init\ default}$ represents the second initial scrambling value, A represents one of the cell identifier, the radio network temporary identifier, and the reserved bit, B represents one of the cell identifier, the radio network temporary identifier, and the reserved bit except A, M and N each are any integer ranging from 0 to 127, and C represents a remaining one obtained after both A and B are excluded from the cell identifier, the radio network temporary identifier, and the reserved bit.

Optionally, in another embodiment, the second initial scrambling value is related to the reserved bit and one of the cell identifier or the radio network temporary identifier, and the second initial scrambling value is determined by the processor based on the following formula:

$$C_{init\ default}=A*2^N+B,$$

where $C_{init\ default}$ represents the second initial scrambling value, A represents the cell identifier or the radio network temporary identifier, B represents the reserved bit, and N is any integer ranging from 0 to 127.

Optionally, in another embodiment, the second initial scrambling value is related to the radio network temporary identifier; and when the payload of the radio network temporary identifier is less than the payload of the first scrambling identifier, the second initial scrambling value is related to the radio network temporary identifier and a zero padding bit, where a quantity of zero padding bits is a difference between the payload of the first scrambling identifier and the payload of the radio network temporary identifier.

It should be understood that, the communications device 500 shown in FIG. 5 can implement each process of the communications device in the method embodiment in FIG. 3. Operations and/or functions of modules in the communications device 500 are intended to implement corresponding procedures in the foregoing method embodiments. For details, refer to the descriptions in the foregoing method embodiments. To avoid repetition, detailed descriptions are properly omitted herein.

Figure 6:
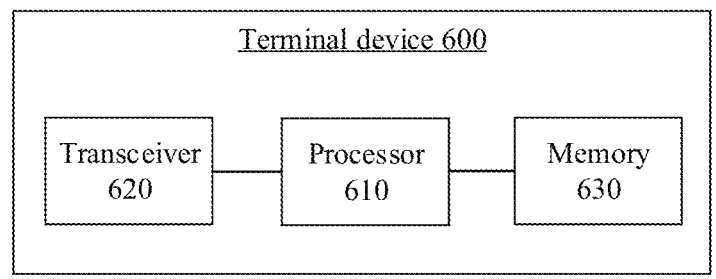
FIG. 6 is a schematic block diagram of a terminal device according to an embodiment of this disclosure.

FIG. 6 is a schematic block diagram of a terminal device 600 according to an embodiment of this disclosure. Specifically, as shown in FIG. 6, the terminal device 600 includes a processor 610 and a transceiver 620.

Optionally, the transceiver 620 may include a control circuit and an antenna. The control circuit may be configured to: perform conversion between a baseband signal and a radio frequency signal, and process the radio frequency signal; and the antenna may be configured to receive and send the radio frequency signal.

Optionally, the terminal device may further include a component such as a memory 660. The memory is mainly configured to store a software program and data. The processor 610 may read the software program in the memory, interpret and execute an instruction of the software program, and process data of the software program.

The processor 610 may be configured to: process a communication protocol and communication data, control the entire terminal device, execute the software program, and process the data of the software program, for example, configured to support the terminal device in performing corresponding operations in the foregoing method embodiments.

The transceiver is configured to receive higher layer signaling, where the higher layer signaling is used to indicate a first identifier and a second identifier.

The processor is configured to: on a same time domain resource, generate, based on the first identifier, first to-be-sent information or demodulate first received information, and generate, based on the second identifier, second to-be-sent information or demodulate second received information, where the first to-be-sent information or the first received information corresponds to a first antenna port or a first antenna port set, the second to-be-sent information or the second received information corresponds to a second antenna port or a second antenna port set, and the first antenna port or the first antenna port set and the second antenna port or the second antenna port set are in a non-quasi co-location (non-QCL) relationship.

Therefore, in the embodiments of this disclosure, the two identifiers are configured by using the higher layer signaling, so that the terminal device may communicate with the two network devices based on the two identifiers, to meet a requirement of joint transmission and improve network performance.

Optionally, in another embodiment, the first identifier is a first sequence generation identifier, the first sequence generation identifier is used to determine a first base sequence, the second identifier is a second sequence generation identifier, and the second sequence generation identifier is used to determine a second base sequence; and the processor is specifically configured to: determine the first base sequence based on the first sequence generation identifier, and determine the second base sequence based on the second sequence generation identifier; and perform cyclic shift on the first base sequence to generate a third sequence, and perform cyclic shift on the second base sequence to generate a fourth sequence; and send, on the same time domain resource, data feedback information corresponding to the third sequence over a first physical uplink control channel PUCCH, and send data feedback information corresponding to the fourth sequence over a second PUCCH, where the first to-be-sent information is the data feedback information corresponding to the third sequence, and the second to-be-sent information is the data feedback information corresponding to the fourth sequence.

Optionally, in another embodiment, the higher layer signaling is used to configure a time-frequency resource occupied by the first PUCCH, the first sequence generation identifier used for the data feedback information transmitted over the first PUCCH, a time-frequency resource occupied by the second PUCCH, and the second sequence generation identifier used for the data feedback information transmitted over the second PUCCH.

Optionally, in another embodiment, the transceiver is further configured to receive first downlink control information DCI transmitted on a first PDCCH resource and second DCI transmitted on a second PDCCH resource, where the data feedback information carried by the first PUCCH corresponds to data scheduled by using the first DCI, the data scheduled by using the first DCI corresponds to the first antenna port or the first antenna port set, the data feedback information carried by the second PUCCH corresponds to data scheduled by using the second DCI, and the data scheduled by using the second DCI corresponds to the second antenna port or the second antenna port set.

Optionally, in another embodiment, the higher layer signaling is further used to indicate a correspondence between the first sequence generation identifier and the first PUCCH and a correspondence between the second sequence generation identifier and the second PUCCH.

Optionally, in another embodiment, the first identifier is a first scrambling identifier, the second identifier is a second scrambling identifier, the first scrambling identifier is used by the terminal device to determine a first initialized scrambling value used for data scrambling, and the second scrambling identifier is used by the terminal device to determine a second initialized scrambling value used for data scrambling; and the processor is specifically configured to: generate the first initialized scrambling value by using the first scrambling identifier, and generate the second initialized scrambling value by using the second scrambling identifier; and generate, on the same time domain resource and by using the first initialized scrambling value, first to-be-sent data or descramble first received data, and generate, on the same time domain resource and by using the second initialized scrambling value, second to-be-sent data or descramble second received data, where the first to-be-sent information is the first to-be-sent data, the first received information is the first received data, the second to-be-sent information is the second to-be-sent data, and the second received information is the second received data.

Optionally, in another embodiment, the higher layer signaling is further used to indicate a correspondence between the first scrambling identifier and the first antenna port or the first antenna port group, and a correspondence between the second scrambling identifier and the second antenna port or the second antenna port group.

Optionally, in another embodiment, the first identifier is the same as the second identifier.

It should be understood that, the terminal device 600 shown in FIG. 6 can implement each process of the terminal device in the method embodiment in FIG. 4. Operations and/or functions of modules in the terminal device 60 are intended to implement corresponding procedures in the foregoing method embodiments. For details, refer to the descriptions in the foregoing method embodiments. To avoid repetition, detailed descriptions are properly omitted herein.

Figure 7:
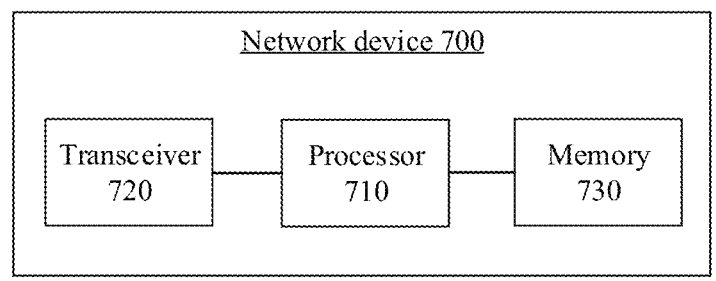
FIG. 7 is a schematic block diagram of a network device according to an embodiment of this disclosure.

FIG. 7 is a schematic block diagram of a network device 700 according to an embodiment of this disclosure. Specifically, as shown in FIG. 7, the network device 700 includes a processor 710 and a transceiver 720.

Optionally, the network device may further include a component such as a memory 730. The memory is mainly configured to store a software program and data. The processor 710 may read the software program in the memory, interpret and execute an instruction of the software program, and process data of the software program.

Optionally, the transceiver 720 may be referred to as a remote radio unit (RRU), a transceiver unit, a transceiver, a transceiver circuit, or the like. The transceiver 720 may include at least one antenna and a radio frequency unit, and the transceiver 720 may be configured to: transmit and receive a radio frequency signal, and perform conversion between the radio frequency signal and a baseband signal.

Optionally, the network device may include a baseband unit (BBU), and the baseband unit includes the processor 710. The baseband unit may be configured to: perform baseband processing such as channel coding, multiplexing, modulation, or spectrum spreading, and control the network device. The transceiver 720 and the baseband unit may be physically disposed together; or may be physically disposed separately, that is, the network device is a distributed network device.

In an example, the baseband unit may include one or more boards, and the plurality of boards may jointly support a radio access network of a single access standard, or may support radio access networks of different access standards.

In an example, the baseband unit may be reconstructed as the foregoing DU function entity and the foregoing CU function entity.

The baseband unit includes the processor 710. The processor 710 may be configured to control the network device to perform corresponding operations in the foregoing method embodiments. Optionally, the baseband unit may further include a memory, and the memory is configured to store a necessary instruction and necessary data.

Specifically, the processor is configured to generate higher layer signaling, where the higher layer signaling is used to indicate a first identifier and a second identifier.

The transceiver is configured to send the higher layer signaling to a terminal device, so that on a same time domain resource, the terminal device generates, based on the first identifier, first to-be-sent information or demodulates first received information, and generates, based on the second identifier, second to-be-sent information or demodulates second received information, where the first to-be-sent information or the first received information corresponds to a first antenna port or a first antenna port set, the second to-be-sent information or the second received information corresponds to a second antenna port or a second antenna port set, and the first antenna port or the first antenna port set and the second antenna port or the second antenna port set are in a non-quasi co-location (non-QCL) relationship.

Therefore, in the embodiments of this disclosure, the two identifiers are configured by using the higher layer signaling, so that the terminal device may communicate with the two network devices based on the two identifiers, to meet a requirement of joint transmission and improve network performance.

Optionally, in another embodiment, the first identifier is a first sequence generation identifier, the first sequence generation identifier is used to determine a first base sequence, the second identifier is a second sequence generation identifier, and the second sequence generation identifier is used to determine a second base sequence; and the first base sequence is used to generate a third sequence through cyclic shift, and the second base sequence is used to generate a fourth sequence through cyclic shift on; and the third sequence is used by the terminal device to send data feedback information corresponding to the third sequence over a first physical uplink control channel PUCCH and on the same time domain resource, and the fourth sequence is used by the terminal device to send data feedback information corresponding to the fourth sequence over a second PUCCH and on the same time domain resource, where the first to-be-sent information is the data feedback information corresponding to the third sequence, and the second to-be-sent information is the data feedback information corresponding to the fourth sequence.

Optionally, in another embodiment, the higher layer signaling is used to configure a time-frequency resource occupied by the first PUCCH, the first sequence generation identifier used for the data feedback information transmitted over the first PUCCH, a time-frequency resource occupied by the second PUCCH, and the second sequence generation identifier used for the data feedback information transmitted over the second PUCCH.

Optionally, in another embodiment, the terminal device is further configured to receive first downlink control information DCI transmitted on a first PDCCH resource and second DCI transmitted on a second PDCCH resource, where the data feedback information carried by the first PUCCH corresponds to data scheduled by using the first DCI, the data scheduled by using the first DCI corresponds to the first antenna port or the first antenna port set, the data feedback information carried by the second PUCCH corresponds to data scheduled by using the second DCI, and the data scheduled by using the second DCI corresponds to the second antenna port or the second antenna port set.

Optionally, in another embodiment, the higher layer signaling is further used to indicate a correspondence between the first sequence generation identifier and the first PUCCH and a correspondence between the second sequence generation identifier and the second PUCCH.

Optionally, in another embodiment, the first identifier is a first scrambling identifier, the second identifier is a second scrambling identifier, the first scrambling identifier is used by the terminal device to determine a first initialized scrambling value used for data scrambling, and the second scrambling identifier is used by the terminal device to determine a second initialized scrambling value used for data scrambling; and the first initialized scrambling value and the second initialized scrambling value are respectively used by the terminal device to generate, on the same time domain resource and by using the first initialized scrambling value, first to-be-sent data or descramble first received data, and generate, on the same time domain resource and by using the second initialized scrambling value, second to-be-sent data or descramble second received data, where the first to-be-sent information is the first to-be-sent data, the first received information is the first received data, the second to-be-sent information is the second to-be-sent data, and the second received information is the second received data.

Optionally, in another embodiment, the higher layer signaling is further used to indicate a correspondence between the first scrambling identifier and the first antenna port or the first antenna port group, and a correspondence between the second scrambling identifier and the second antenna port or the second antenna port group.

Optionally, in another embodiment, the first identifier is the same as the second identifier.

It should be understood that, the network device 700 shown in FIG. 7 can implement each process of the network device in the method embodiment in FIG. 4. Operations and/or functions of modules in the network device 700 are intended to implement corresponding procedures in the foregoing method embodiments. For details, refer to the descriptions in the foregoing method embodiments. To avoid repetition, detailed descriptions are properly omitted herein.

It should be understood that a processor in the foregoing embodiments of this disclosure may be implemented by using a processing unit or a chip. Optionally, the processing unit may include a plurality of units in an implementation process.

It should be understood that a transceiver in the foregoing embodiments of the present disclosure may be implemented by using a transceiver unit or a chip. Optionally, the transceiver may include a transmitter or a receiver, or may include a transmitting unit or a receiving unit.

It should be understood that the processor and the transceiver in the embodiments of the present disclosure each may be implemented by using a chip.

An embodiment of this disclosure further provides a processing apparatus, including a processor and an interface. The processor is configured to perform the information transmission method in any one of the foregoing method embodiments.

It should be understood that the foregoing processing apparatus may be a chip. The processor may be implemented by using hardware, or may be implemented by using software. When being implemented by using hardware, the processor may be a logic circuit, an integrated circuit, or the like. When being implemented by using software, the processor may be a general-purpose processor, and is implemented by reading software code stored in a memory. The memory may be integrated into the processor, or may exist independently outside the processor.

For example, the processing apparatus may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

An embodiment of the present disclosure further provides a communications device, including a processing unit and a transceiver unit. The processing unit and the transceiver unit may be implemented by using software or may be implemented by using hardware. When being implemented by using hardware, the processing unit may be the processor described above, and the transceiver unit may be the transceiver described above.

It should be understood that, in the embodiments of this disclosure that are described above, the processor may be a CPU, or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The memory may include a read-only memory and a random access memory, and provide an instruction and data to the processor. A part of the memory may further include a non-volatile random access memory.

In an implementation process, blocks in the foregoing methods can be implemented by using a hardware integrated logic circuit in the processor, or by using instructions in a form of software. The blocks of the methods disclosed with reference to the embodiments of this disclosure may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the blocks in the foregoing methods in combination with hardware of the processor. To avoid repetition, details are not described herein again.

It should be noted that, the processor in the embodiments of the present disclosure may be an integrated circuit chip, and has a signal processing capability. In an implementation process, blocks in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the blocks, and the logical block diagrams that are disclosed in the embodiments of the present disclosure. The general-purpose processor may be a microprocessor, or the processor may be any conventional processor or the like. Blocks of the methods disclosed with reference to the embodiments of the present disclosure may be directly performed and accomplished by a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the blocks in the foregoing methods in combination with hardware of the processor.

It may be understood that the memory in the embodiments of the present disclosure may be a volatile memory or a nonvolatile memory, or may include a volatile memory and a nonvolatile memory. The nonvolatile memory may be a read-only memory (ROM), a programmable read-only memory (e.g., programmable ROM, PROM), an erasable programmable read-only memory (e.g., erasable PROM, EPROM), an electrically erasable programmable read-only memory (e.g., electrically EPROM, EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (e.g., double data rate SDRAM, DDR SDRAM), an enhanced synchronous dynamic random access memory (e.g., enhanced SDRAM, ESDRAM), a synchronous link dynamic random access memory (e.g., synchlink DRAM, SLDRAM), and a direct rambus dynamic random access memory (e.g., direct rambus RAM, DR RAM). It should be noted that the memories of the systems and methods described in this specification include but are not limited to these and any memory of another proper type.

An embodiment of this disclosure further provides a computer-readable medium. The computer-readable medium stores a computer program. When the computer program is executed by a computer, the information transmission method in any one of the foregoing method embodiments is implemented.

An embodiment of this disclosure further provides a computer program product. When the computer program product is executed by a computer, the information transmission method in any one of the foregoing method embodiments is implemented All or some of the foregoing embodiments may be implemented by using software, hardware, firmware, or any combination thereof. When software is used to implement the embodiments, all or some of the embodiments may be implemented in a form of a computer program product. The computer program product includes one or more computer program instructions. When the computer program instruction is loaded and executed on a computer, the procedure or functions according to the embodiments of this disclosure are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-dense digital video disc (DVD)), a semiconductor medium (for example, a solid-state drive (SSD)), or the like.

The terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in the figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by performing a local and/or remote process and based on, for example, a signal having one or more data packets (for example, data from two components interacting with another component in a local system, a distributed system, and/or across a network such as an internet interacting with another system by using the signal).

It should be further understood that, the first, second, third, fourth, and various numbers included in this specification are merely distinguished for convenient description, and are not intended to limit the scope of the embodiments of this disclosure.

It should be understood that "an embodiment" or "an embodiment" throughout the specification means that particular features, structures, or characteristics related to the embodiments are included in at least one embodiment of the present disclosure. Therefore, "in an embodiment" or "in an embodiment" appearing throughout the specification does not refer to a same embodiment. In addition, these particular features, structures, or characteristics may be combined in one or more embodiments in any proper manner. It should be understood that sequence numbers of the foregoing processes do not mean execution sequences in the embodiments of the present disclosure. The execution sequences of the processes should be determined based on functions and internal logic of the processes, and should not be construed as any limitation on the implementation processes of the embodiments of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined based on A. However, it should further be understood that determining A based on B does not mean that B is determined based on A only; that is, B may also be determined based on A and/or other information.

A person of ordinary skill in the art may be aware that, in combination with the units and algorithm blocks in the examples described in the embodiments disclosed in this specification, this disclosure may be implemented by electronic hardware, computer software, or a combination thereof. To clearly describe the interchangeability between the hardware and the software, the foregoing has generally described compositions and blocks of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiments are merely examples. For example, division into the modules or units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments of the present disclosure.

In addition, function units in the embodiments of the present disclosure may be integrated into one processing unit, or each of the units may exist alone physically, or two or more units are integrated into one unit. The integrated unit may be implemented in a form of hardware, or may be implemented in a form of a software function unit.

According to the foregoing descriptions of the implementations, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely preferred embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A method, comprising:
receiving, by a terminal device, higher layer signaling, wherein the higher layer signaling indicates a first identifier and a second identifier, wherein the first identifier is a first sequence generation identifier used to determine a first base sequence, and wherein the second identifier is a second sequence generation identifier used to determine a second base sequence;
generating, by the terminal device on a same time domain resource and based on the first identifier, first to-be-sent information or demodulating first received information; and
generating, on the same time domain resource and based on the second identifier, second to-be-sent information or demodulating second received information, wherein the first to-be-sent information or the first received information corresponds to a first antenna port or a first antenna port set, the second to-be-sent information or the second received information corresponds to a second antenna port or a second antenna port set, and the first antenna port or the first antenna port set and the second antenna port or the second antenna port set are in a non-quasi co-location (non-QCL) relationship.

2. The method of claim 1, wherein
generating, by the terminal device on the same time domain resource and based on the first identifier, first to-be-sent information or demodulating first received information, and generating, on the same time domain resource and based on the second identifier, second to-be-sent information or demodulating second received information comprises:
determining, by the terminal device, the first base sequence based on the first sequence generation identifier, and determining the second base sequence based on the second sequence generation identifier;
performing, by the terminal device, cyclic shift on the first base sequence to generate a third sequence, and performing cyclic shift on the second base sequence to generate a fourth sequence; and
sending, by the terminal device on the same time domain resource, data feedback information corresponding to the third sequence over a first physical uplink control channel (PUCCH), and sending data feedback information corresponding to the fourth sequence over a second PUCCH, wherein the first to-be-sent information is the data feedback information corresponding to the third sequence, and the second to-be-sent information is the data feedback information corresponding to the fourth sequence.

3. The method of claim 2, wherein
the higher layer signaling is used to configure a time-frequency resource occupied by the first PUCCH and the first sequence generation identifier used for the data feedback information transmitted over the first PUCCH, and a time-frequency resource occupied by the second PUCCH and the second sequence generation identifier used for the data feedback information transmitted over the second PUCCH.

4. The method of claim 1, wherein
the first identifier is a first scrambling identifier, the second identifier is a second scrambling identifier, the first scrambling identifier is used by the terminal device to determine a first initialized scrambling value used for data scrambling, and the second scrambling identifier is used by the terminal device to determine a second initialized scrambling value used for data scrambling; and
generating, by the terminal device on the same time domain resource and based on the first identifier, first to-be-sent information or demodulating first received information, and generating, on the same time domain resource and based on the second identifier, second to-be-sent information or demodulating second received information comprises:
generating, by the terminal device, the first initialized scrambling value based on the first scrambling identifier, and generating the second initialized scrambling value based on the second scrambling identifier; and
generating, by the terminal device on the same time domain resource and based on the first initialized scrambling value, first to-be-sent data or descrambling first received data, and generating, on the same time domain resource and based on the second initialized scrambling value, second to-be-sent data or descrambling second received data, wherein the first to-be-sent information is the first to-be-sent data, the first received information is the first received data, the second to-be-sent information is the second to-be-sent data, and the second received information is the second received data.

5. The method of claim 4, wherein
the higher layer signaling is further used to indicate a correspondence between the first scrambling identifier and the first antenna port or a first antenna port group, and a correspondence between the second scrambling identifier and the second antenna port or a second antenna port group.

6. A terminal device, comprising:
a transceiver configured to receive higher layer signaling, wherein the higher layer signaling indicates a first identifier and a second identifier, wherein the first identifier is a first sequence generation identifier used to determine a first base sequence, and wherein the second identifier is a second sequence generation identifier used to determine a second base sequence; and
a processor configured to:
on a same time domain resource, generate, based on the first identifier, first to-be-sent information or demodulate first received information, and
generate, based on the second identifier, second to-be-sent information or demodulate second received information, wherein the first to-be-sent information or the first received information corresponds to a first antenna port or a first antenna port set, the second to-be-sent information or the second received information corresponds to a second antenna port or a second antenna port set, and the first antenna port or the first antenna port set and the second antenna port or the second antenna port set are in a non-quasi co-location (non-QCL) relationship.

7. The terminal device of claim 6, wherein
the processor is specifically configured to: determine the first base sequence based on the first sequence generation identifier, and determine the second base sequence based on the second sequence generation identifier;
perform cyclic shift on the first base sequence to generate a third sequence, and perform cyclic shift on the second base sequence to generate a fourth sequence; and
send, on the same time domain resource, data feedback information corresponding to the third sequence over a first physical uplink control channel (PUCCH), and send data feedback information corresponding to the fourth sequence over a second PUCCH, wherein the first to-be-sent information is the data feedback information corresponding to the third sequence, and the second to-be-sent information is the data feedback information corresponding to the fourth sequence.

8. The terminal device of claim 7, wherein
the higher layer signaling is used to configure a time-frequency resource occupied by the first PUCCH and the first sequence generation identifier used for the data feedback information transmitted over the first PUCCH, and a time-frequency resource occupied by the second PUCCH and the second sequence generation identifier used for the data feedback information transmitted over the second PUCCH.

9. The terminal device of claim 6, wherein
the first identifier is a first scrambling identifier, the second identifier is a second scrambling identifier, the first scrambling identifier is used by the terminal device to determine a first initialized scrambling value used for data scrambling, and the second scrambling identifier is used by the terminal device to determine a second initialized scrambling value used for data scrambling; and
the processor is specifically configured to: generate the first initialized scrambling value based on the first scrambling identifier, and generate the second initialized scrambling value based on the second scrambling identifier; and
generate, on the same time domain resource and based on the first initialized scrambling value, first to-be-sent data or demodulate first received data, and generate, on the same time domain resource and based on the second initialized scrambling value, second to-be-sent data or demodulate second received data, wherein the first to-be-sent information is the first to-be-sent data, the first received information is the first received data, the second to-be-sent information is the second to-be-sent data, and the second received information is the second received data.

10. The terminal device of claim 9, wherein
the higher layer signaling is further used to indicate a correspondence between the first scrambling identifier and a first antenna port or the first antenna port group, and a correspondence between the second scrambling identifier and the second antenna port or a second antenna port group.

11. A non-transitory computer-readable medium having instructions stored therein, which when executed by a processor, cause the processor to perform operations, the operations comprising:
receiving higher layer signaling, wherein the higher layer signaling indicates a first identifier and a second identifier, wherein the first identifier is a first sequence generation identifier used to determine a first base sequence, and wherein the second identifier is a second sequence generation identifier used to determine a second base sequence;
generating, on a same time domain resource and based on the first identifier, first to-be-sent information or demodulating first received information; and
generating, on the same time domain resource and based on the second identifier, second to-be-sent information or demodulating second received information, wherein the first to-be-sent information or the first received information corresponds to a first antenna port or a first antenna port set, the second to-be-sent information or the second received information corresponds to a second antenna port or a second antenna port set, and the first antenna port or the first antenna port set and the second antenna port or the second antenna port set are in a non-quasi co-location (non-QCL) relationship.

12. The computer-readable medium of claim 11, wherein
generating, on the same time domain resource and based on the first identifier, first to-be-sent information or demodulating first received information, and generating, on the same time domain resource and based on the second identifier, second to-be-sent information or demodulating second received information comprises:
determining the first base sequence based on the first sequence generation identifier, and determining the second base sequence based on the second sequence generation identifier;
performing cyclic shift on the first base sequence to generate a third sequence, and performing cyclic shift on the second base sequence to generate a fourth sequence; and
sending, on the same time domain resource, data feedback information corresponding to the third sequence over a first physical uplink control channel (PUCCH), and sending data feedback information corresponding to the fourth sequence over a second PUCCH, wherein the first to-be-sent information is the data feedback information corresponding to the third sequence, and the second to-be-sent information is the data feedback information corresponding to the fourth sequence.

13. The computer-readable medium of claim 12, wherein
the higher layer signaling is used to configure a time-frequency resource occupied by the first PUCCH and the first sequence generation identifier used for the data feedback information transmitted over the first PUCCH, and a time-frequency resource occupied by the second PUCCH and the second sequence generation identifier used for the data feedback information transmitted over the second PUCCH.

14. The computer-readable medium of claim 11, wherein
the first identifier is a first scrambling identifier, the second identifier is a second scrambling identifier, the first scrambling identifier is used by a terminal device to determine a first initialized scrambling value used for data scrambling, and the second scrambling identifier is used by the terminal device to determine a second initialized scrambling value used for data scrambling; and generating, on the same time domain resource and based on the first identifier, first to-be-sent information or demodulating first received information, and generating, on the same time domain resource and based on the second identifier, second to-be-sent information or demodulating second received information comprises:

generating the first initialized scrambling value based on the first scrambling identifier, and generating the second initialized scrambling value based on the second scrambling identifier; and generating, on the same time domain resource and based on the first initialized scrambling value, first to-be-sent data or descrambling first received data, and generating, on the same time domain resource and based on the second initialized scrambling value, second to-be-sent data or descrambling second received data, wherein the first to-be-sent information is the first to-be-sent data, the first received information is the first received data, the second to-be-sent information is the second to-be-sent data, and the second received information is the second received data.

15. The computer-readable medium of claim 14, wherein the higher layer signaling is further used to indicate a correspondence between the first scrambling identifier and the first antenna port or a first antenna port group, and a correspondence between the second scrambling identifier and the second antenna port or a second antenna port group.

\* \* \* \* \*